(12) United States Patent
Miller et al.

(10) Patent No.: US 11,826,864 B1
(45) Date of Patent: Nov. 28, 2023

(54) MODULAR VISE

(71) Applicant: Elijah Tooling, Inc., Denton, TX (US)

(72) Inventors: Richard V. Miller, Denton, TX (US);
Julie A. Miller, Denton, TX (US);
Austin C. Styer, Denton, TX (US);
Derek L. Phillips, Denton, TX (US)

(73) Assignee: Elijah Tooling, Inc., Denton, TX (US)

( * ) Notice: Subject to any disclaimer, the term of this patent is extended or adjusted under 35 U.S.C. 154(b) by 648 days.

(21) Appl. No.: 16/828,706

(22) Filed: Mar. 24, 2020

Related U.S. Application Data

(63) Continuation-in-part of application No. 15/356,321, filed on Nov. 18, 2016, now Pat. No. 10,596,673.

(60) Provisional application No. 62/256,865, filed on Nov. 18, 2015.

(51) Int. Cl.
*B23Q 17/00* (2006.01)
*B25B 1/10* (2006.01)

(52) U.S. Cl.
CPC ............ *B23Q 17/005* (2013.01); *B25B 1/103* (2013.01)

(58) Field of Classification Search
CPC .......... B23Q 17/005; B25B 1/103; B25B 1/10
USPC ................................. 269/244, 136, 329, 283
See application file for complete search history.

(56) References Cited

U.S. PATENT DOCUMENTS

| | | | |
|---|---|---|---|
| 2,341,619 A | 2/1944 | Huss | |
| 4,191,367 A * | 3/1980 | Speiser | B25B 1/02 384/42 |
| 4,299,377 A | 11/1981 | Lenz | |
| 4,738,438 A | 4/1988 | Horie et al. | |
| 5,562,277 A * | 10/1996 | Swann | B23Q 3/103 269/88 |
| 6,931,969 B2 | 8/2005 | Hsien | |
| 8,770,902 B1 * | 7/2014 | Miller | F16B 5/0208 29/451 |
| 9,272,378 B1 * | 3/2016 | Miller | B23Q 3/066 |
| 9,352,451 B1 * | 5/2016 | Warth | B25B 1/103 |
| 9,636,801 B1 * | 5/2017 | Lee | B25B 1/02 |
| 10,596,673 B1 | 3/2020 | Miller et al. | |
| 2008/0084017 A1 * | 4/2008 | Barziza | B23Q 3/103 269/100 |

OTHER PUBLICATIONS

Office Action dated Nov. 14, 2017 from corresponding U.S. Appl. No. 15/356,321.
Petition to Revive and Amendment dated Oct. 22, 208 from corresponding U.S. Appl. No. 15/356,321.
Final Office Action dated Jul. 29, 2019 from corresponding U.S. Appl. No. 15/356,321.
Amendment After Final dated Sep. 30, 2019 from corresponding U.S. Appl. No. 15/356,321.
Notice of Allowance dated Nov. 15, 2019 from corresponding U.S. Appl. No. 15/356,321.

(Continued)

*Primary Examiner* — Lee D Wilson
*Assistant Examiner* — Shantese L McDonald
(74) *Attorney, Agent, or Firm* — James E. Walton

(57) ABSTRACT

A pressure applying system using a modular vise having a fixed base and an adjustable pusher assembly. The modular vise utilizes a bi-directional worm screw to apply a linear force from the pusher assembly to the working member relative to the fixed base. The fixed base is secured and located from below a bottom surface of the fixed base.

17 Claims, 32 Drawing Sheets

(56) References Cited

OTHER PUBLICATIONS

Office Action dated Feb. 3, 2020 from related U.S. Appl. No. 15/883,991.
Amendment dated Mar. 18, 2020 from related U.S. Appl. No. 15/883,991.
Notice of Allowance dated Apr. 8, 2020 from related U.S. Appl. No. 15/883,991.
Filing Receipt and Notice of Omitted Items dated Feb. 10, from related U.S. Appl. No. 16/747,079.
Response to Notice of Omitted Items dated Mar. 18, 2020 from related U.S. Appl. No. 16/747,079.
Notice of Incomplete Reply dated Mar. 24, 2020 from related U.S. Appl. No. 16/747,079.
Response to Notice of Incomplete Reply dated Apr. 2, 2020 from related U.S. Appl. No. 16/747,079.

* cited by examiner

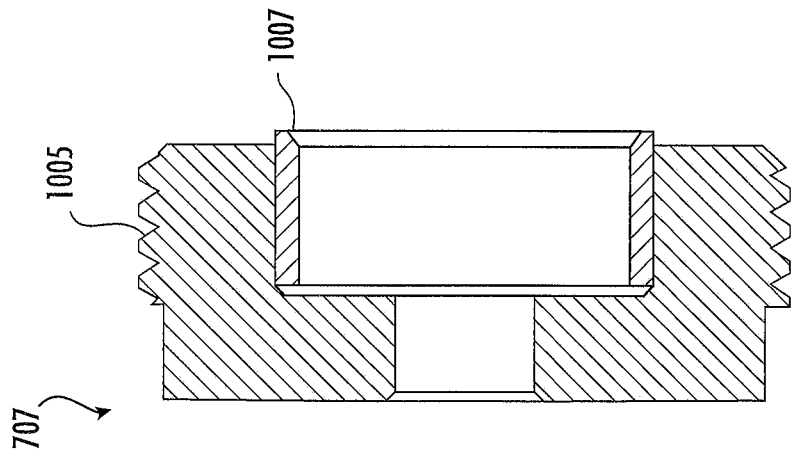
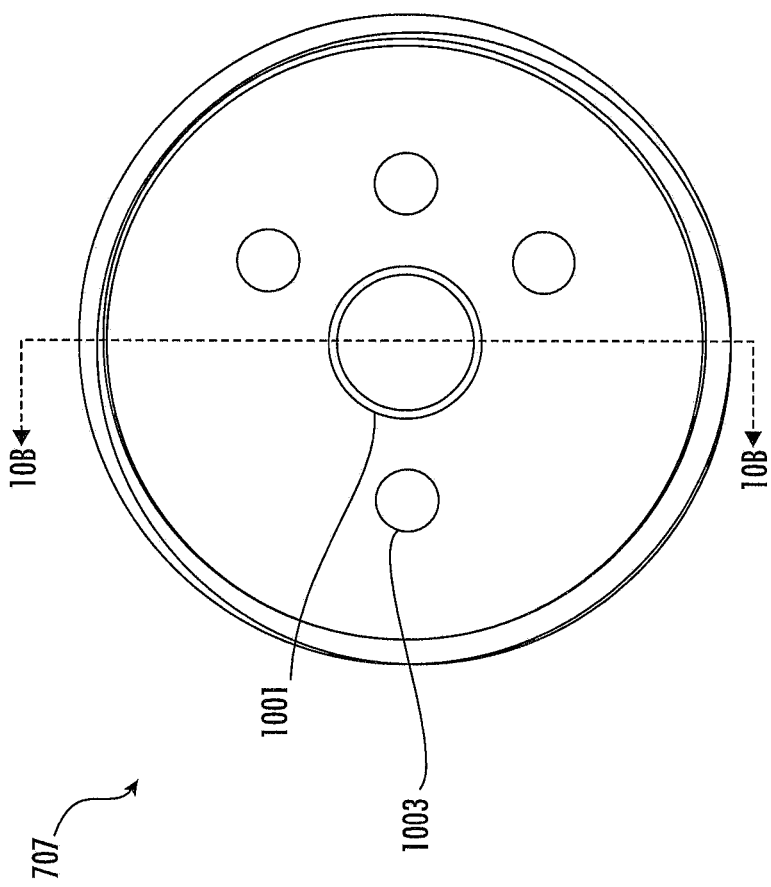
FIG. 10B
FIG. 10A

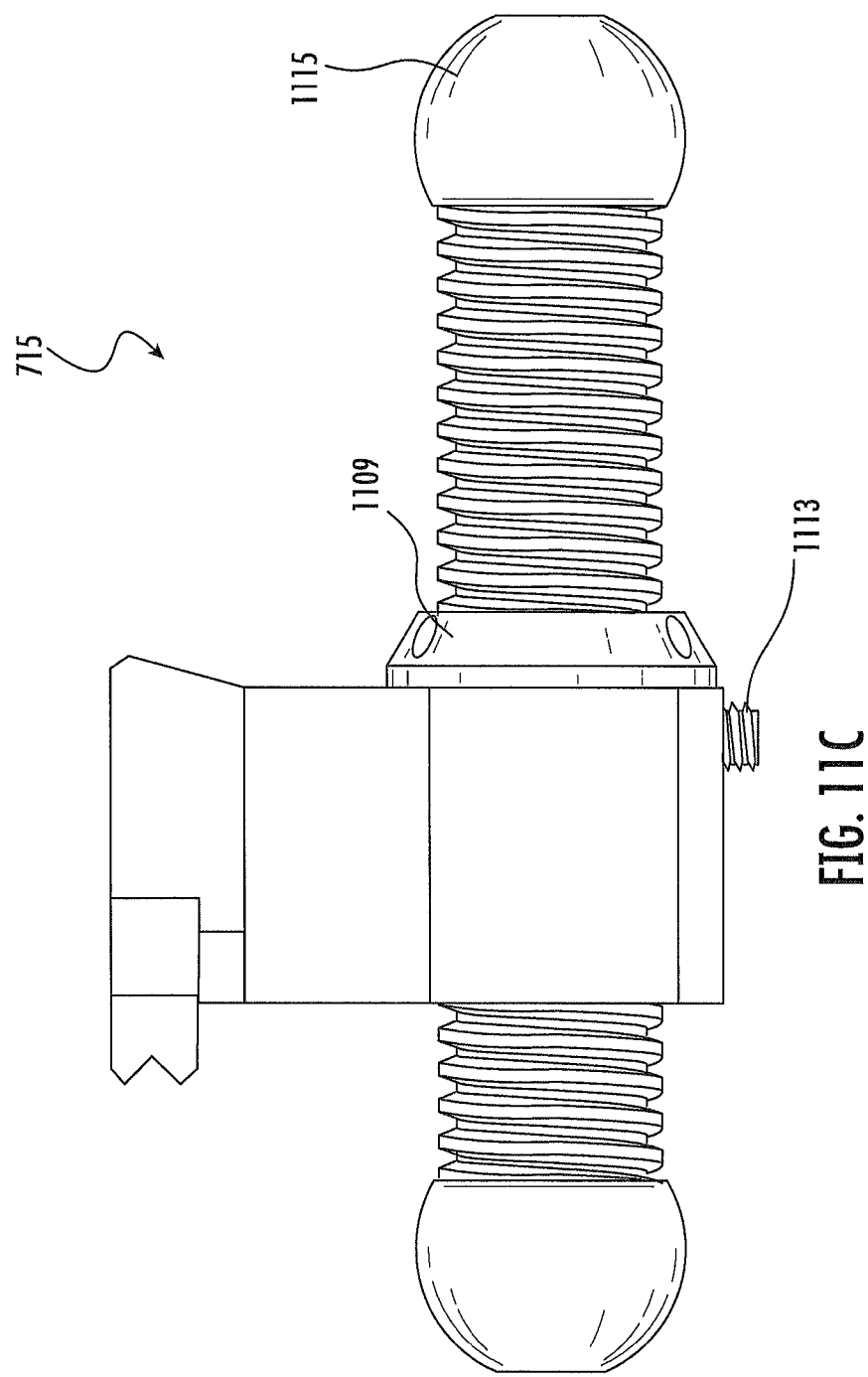

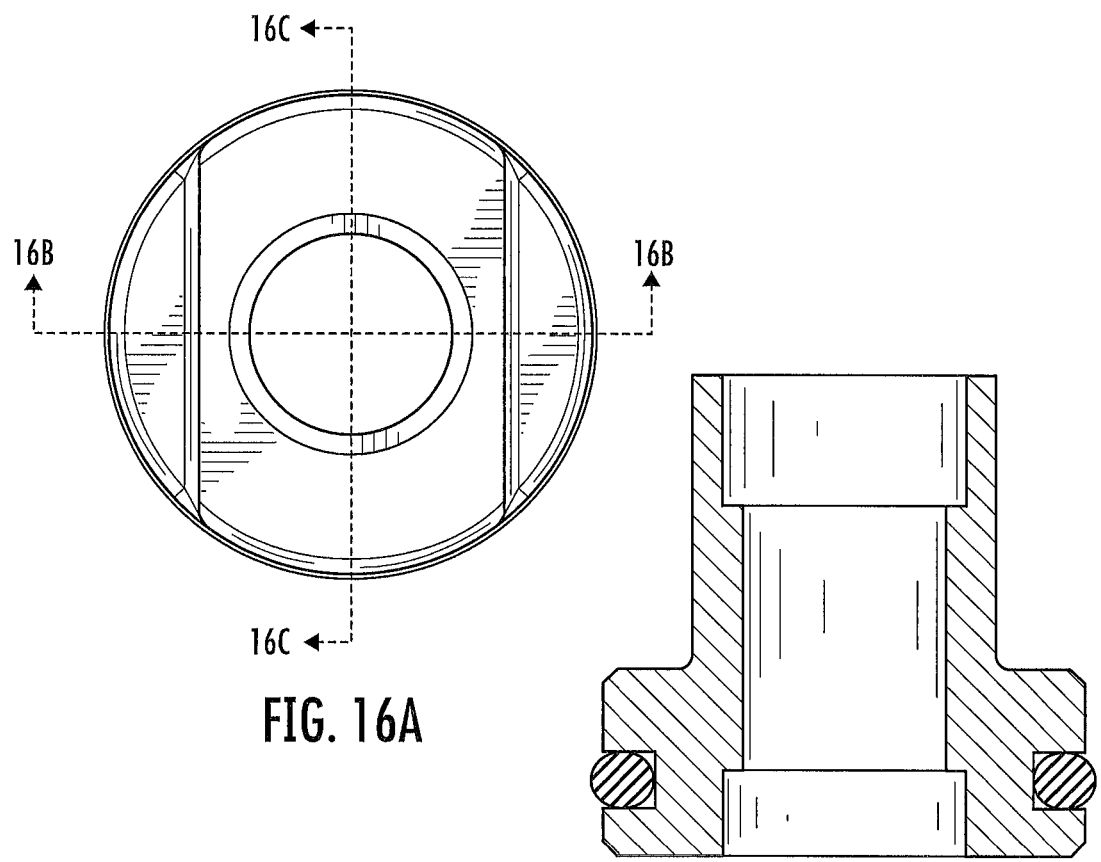
FIG. 16A
FIG. 16B
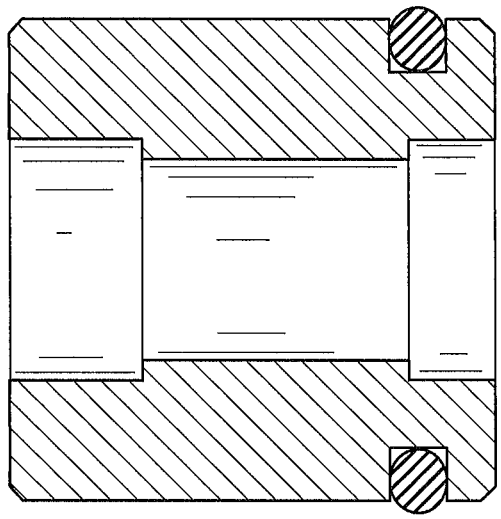
FIG. 16C
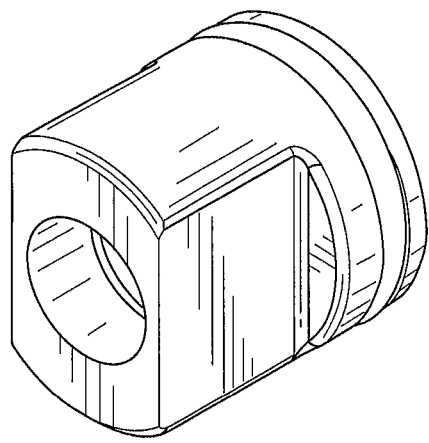
FIG. 16D

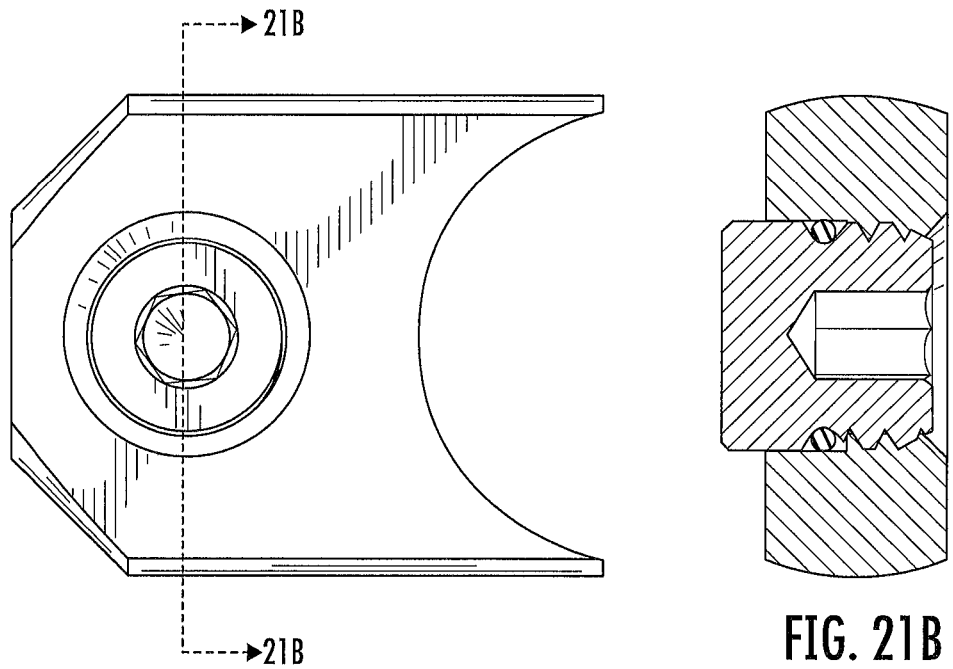
FIG. 21A
FIG. 21B
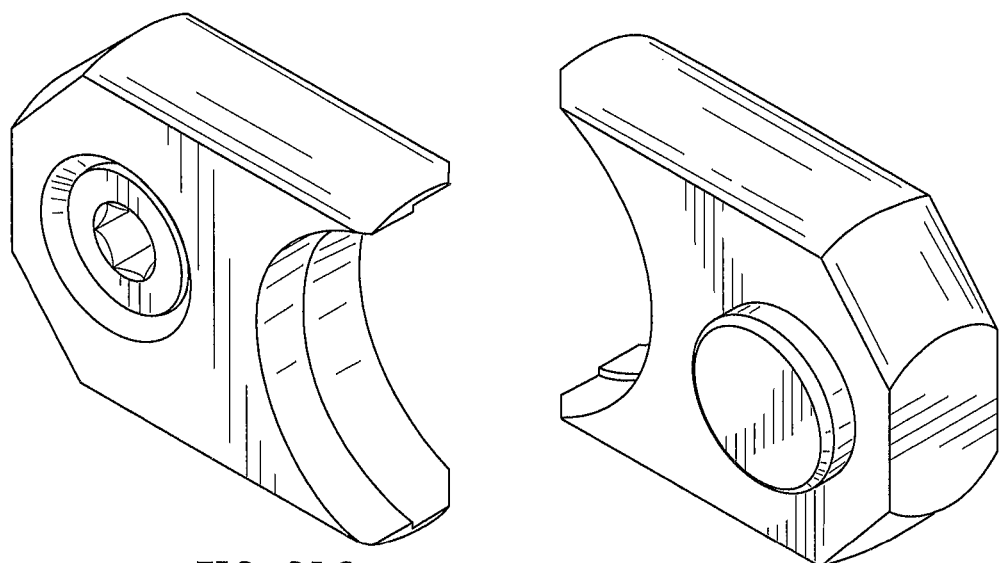
FIG. 21C
FIG. 21D

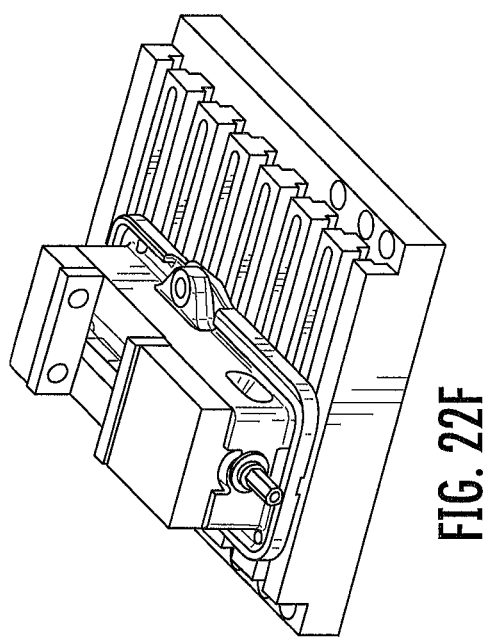
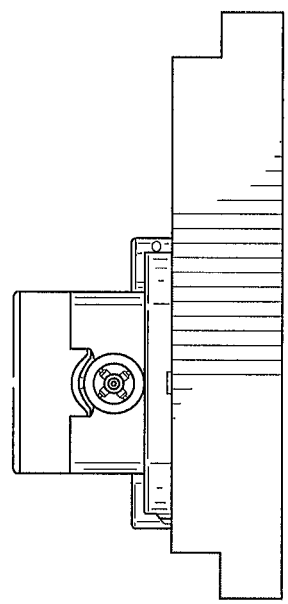
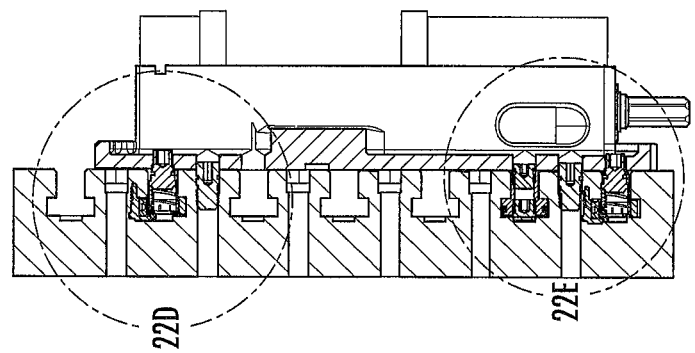
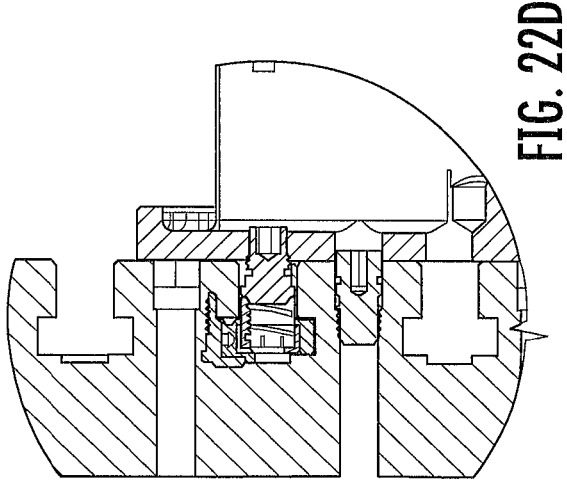
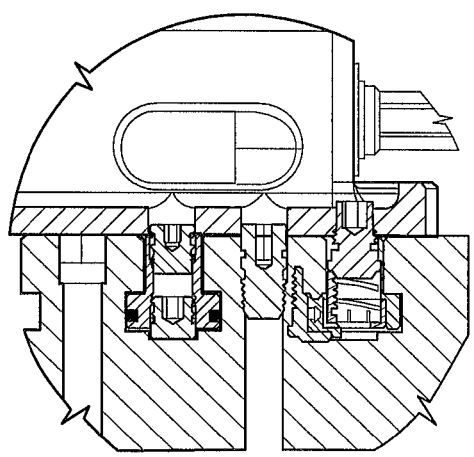
FIG. 22F
FIG. 22B
FIG. 22C
FIG. 22D
FIG. 22E

US 11,826,864 B1

MODULAR VISE

CROSS REFERENCE TO RELATED APPLICATIONS

This application is a continuation-in-part of U.S. patent application Ser. No. 15/356,321, filed 18 Nov. 2016, titled "Modular Pressure Application System", by Richard V. Miller, et al., which claims the benefit of U.S. Provisional Application No. 62/256,865, filed 18 Nov. 2015, titled "Precision Locating Fastening System", all of which are hereby incorporated by reference for all purposes as if fully set forth herein.

BACKGROUND

Field of the Invention

The present invention relates in general to modular vises, and, in particular, to modular vises that provide digital feedback regarding applied force. Conventional vises have a fixed opening and do not provide feedback to the user. Therefore the user is likely to over apply force to a working material while holding it in a vise. Materials that have been retained in a vise under too much stress require additional work to accommodate the effects of the overstress. Furthermore, because the opening on conventional vises are fixed, larger pieces of working material cannot be retained if they are bigger than the throw of a conventional vise.

There are many designs of vises well known in the art. However, considerable shortcomings remain.

BRIEF DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIG. 10A is a front view of a keeper assembly in accordance with a preferred embodiment of the present application.

FIG. 10B is a section view of a keeper assembly taken along Line 10B-10B in accordance with a preferred embodiment of the present application.

FIG. 11C is an end view of a pusher assembly in accordance with a preferred embodiment of the present application.

FIGS. 12A-13D and 15A-21D depict a fastener used to releasably fasten a first object and a second object.

FIG. 12A— Depicts the spring in top view. This spring is the preferred embodiment since it compresses to an almost flat condition, and is used to bias the stud up and out of the housing. Other spring configurations can also be used, depending upon the configuration of the release inset, housing and stud.

FIG. 13D— Depicts the assembled fastener in trimetric view.

14A, 14B, 14C, 14D, 14E— Depict a T-Slot type fixture with specific, modular characteristics, that when used in combination with FIG. 13A-13D type fasteners and FIG. 19A-19D type locators, can accurately and precisely locate as well as hold objects.

Figure 14E:
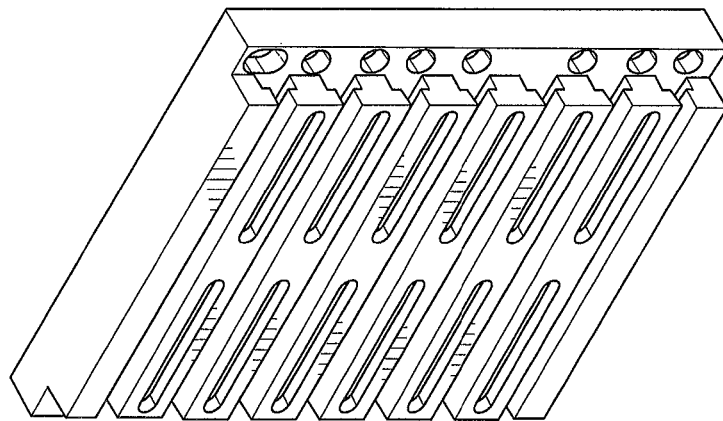
Figure 14C:
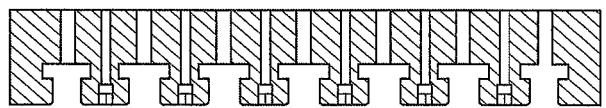
Figure 14A:
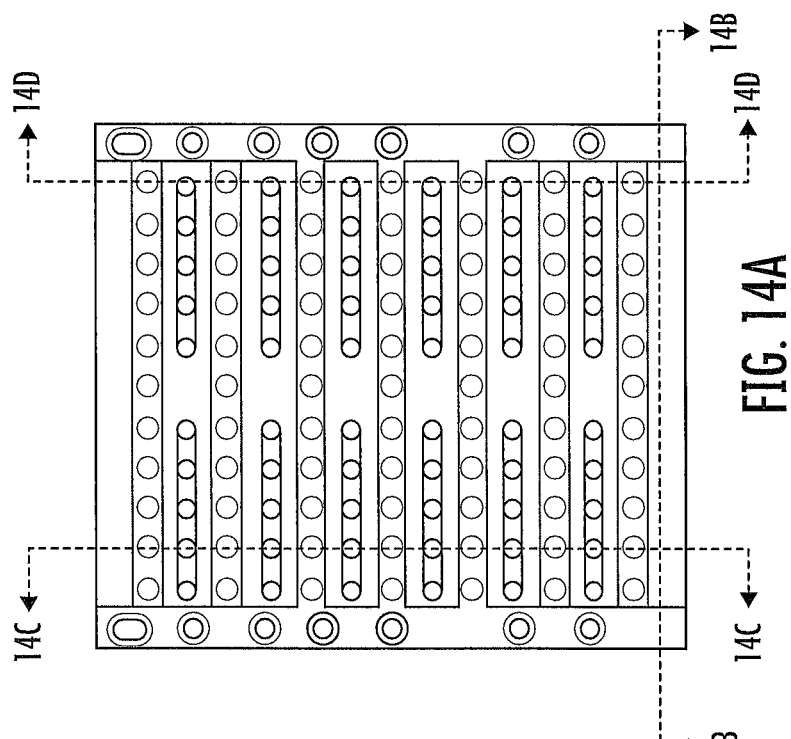

FIG. 14A— Depicts the modular T-Slot fixture in top view.

Figure 14B:
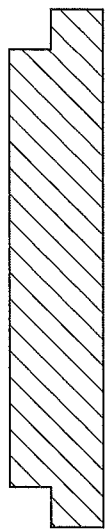

FIG. 14B— Depicts the modular T-Slot fixture in section view.

FIG. 14C— Depicts the modular T-Slot fixture in section view. Here it can be observed that the slots are at specific distances from each other forming a continuous pattern of slots. In the base of the slot is a bored (precise) circular countersink that is manufactured such that it is precisely related to every other hole in the slot as well as the holes that are adjacent to it in the raised portion of the T-Slot. This counter-bore, when used in conjunction with FIG. 13A-13D locator will precisely locate a second object (FIG. 13A-13D) to the first object (FIG. 21A-21D locator).

Figure 14D:
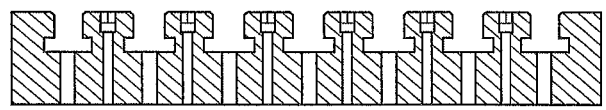

FIG. 14D— Depicts the modular T-Slot fixture in section view. Here it can be observed that there are combination holes consisting of a bored (precise diameter) counterbore plus threaded portion below. This hole, referred to as a multi-purpose hole, serve as a means to locate and hold using screws, dowels, retractable dowels, shoulder screws, supports, and other locating/holding objects. The bore+ insert is a preferred embodiment, but can be replaced/ substituted with hardened inserts, such as precision threaded locator bushings, bushings, threaded inserts, helicoil inserts and similar.

FIG. 14E— Depicts the modular T-Slot fixture in trimetric view. Any combination of lower countersunk holes+upper multi-purpose holes can be used, with the consideration that they are all precisely located to each other and specific, precise distances apart, in a grid type pattern. In addition, there is a precisely width slot in the top of the T-Slot riser that facilitates use of special use, modular vises, that can benefit from the T-Slot modular fixture, being held by the T-slot fastener, and located by the retractable dowel pins in the base of the vise, with the precise slot feature.

FIGS. 15A-18D— Depict a novel locating device (T-slot locator) that consists of a modified FIG. 16A-16D housing in which the internal features are now adapted to accept retractable dowel pins. The preferred embodiment of the housing incorporate flats to remove the O-ring, but may also exclude them. The retractable dowel pin in the base can be raised and lowered, such that it can be in use, or not. When lowered the retractable dowel pin engages and locates with the counter-bore in the T-slot fixture. Due to the close concentricity in the housing this location is then made available to the top retractable dowel pin, which in turn locates the second object. When lowering the base retractable dowel pin the housing is biased against the T-slot fixture, holding the T-slot fastener in place.

Figure 15A:
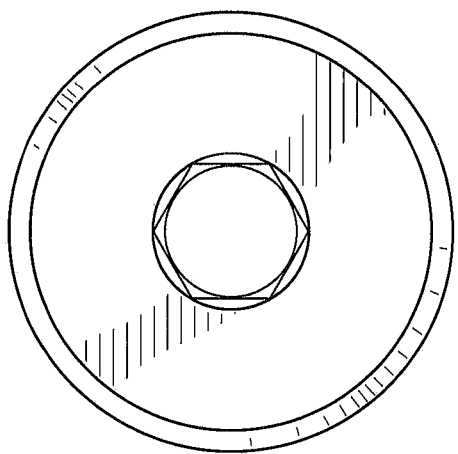
Figure 15B:
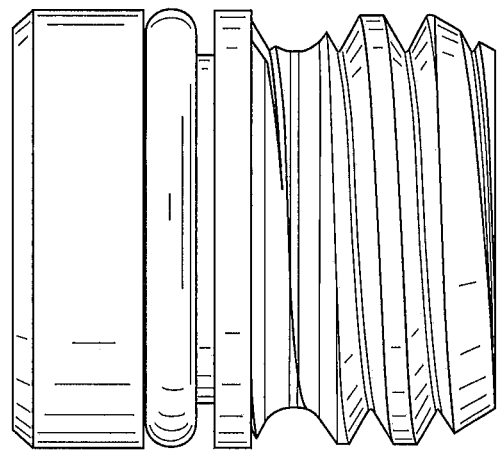
Figure 15C:
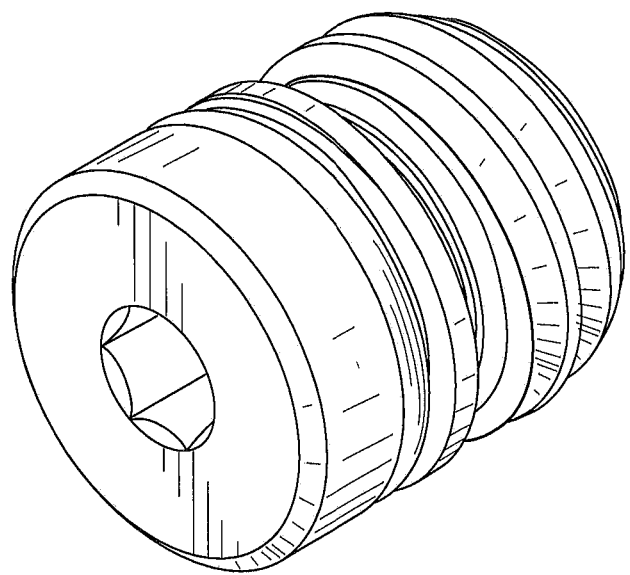

FIGS. 15A, 15B, 15C— Depict the retractable dowel pin which consists of a locating shoulder; drive feature (shown as a hex but may include other features) on either end, or both; threads; and O-ring. The retractable dowel pin, when screwed into a multi-purpose hole (defined as a bored plus threaded hole) provides exact location to a secondary object.

FIG. 16A— Depicts the housing in top view. The preferred embodiment incorporates a circular outside diameter, but there are other shapes that may be used.

FIG. 16B— Depicts the housing in section view. Here it can be observed that the housing incorporates precise counterbores in both ends and a threaded portion between them. The counter-bores are held coincident to each other such that the location of the lower retractable dowel pin is translated to the top retractable dowel pin. The housing sectional shape conforms (male to female) to the shape of the T-slot.

FIG. 16C— Depicts the housing in section view.

FIG. 16D— Depicts the housing in trimetric view.

Figure 17A:
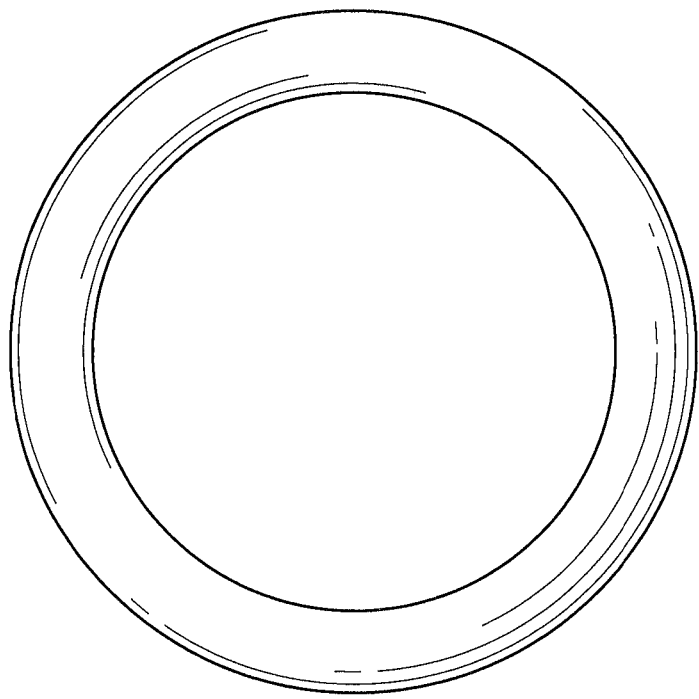
Figure 17B:
Figure 17C:
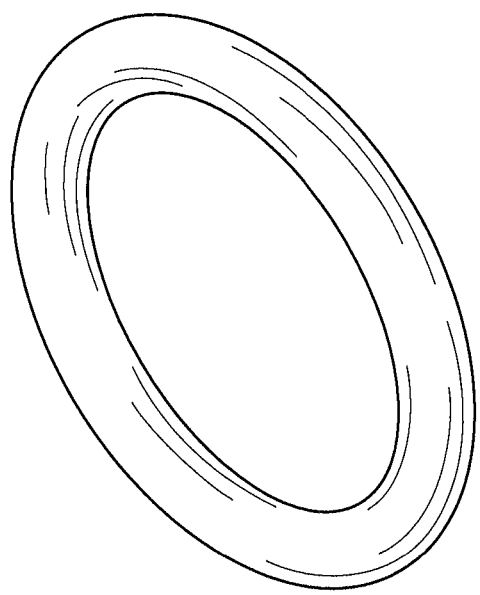

FIGS. 17A, 17B, 17C— Depict the O-ring in different views. The O-ring is a preferred embodiment, used to create friction in the slot. There are specific features of the housing (flats) that are incorporated to make the O-ring optional by removal. When the O-ring is removed, the fastener slides easily in the slot, which is a desirable characteristic, at times.

Figure 18A:
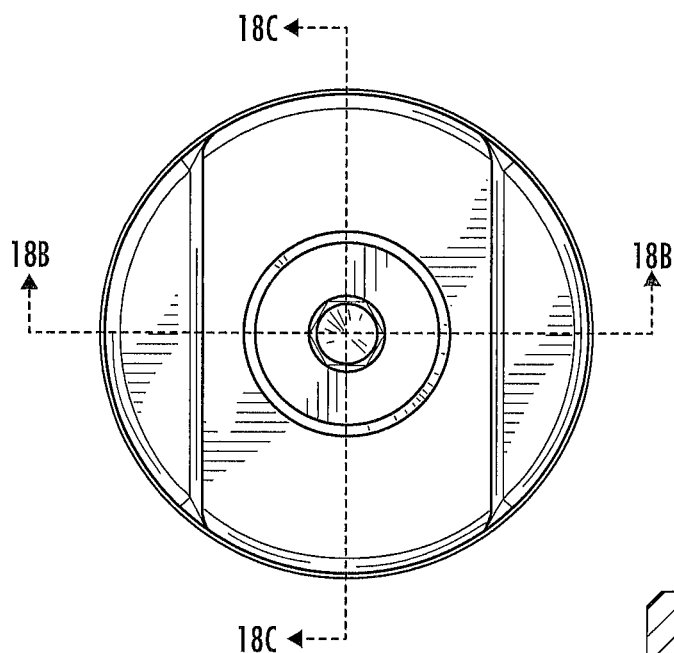

FIG. 18A— Depicts the assembled T-slot locator in top view.

Figure 18B:
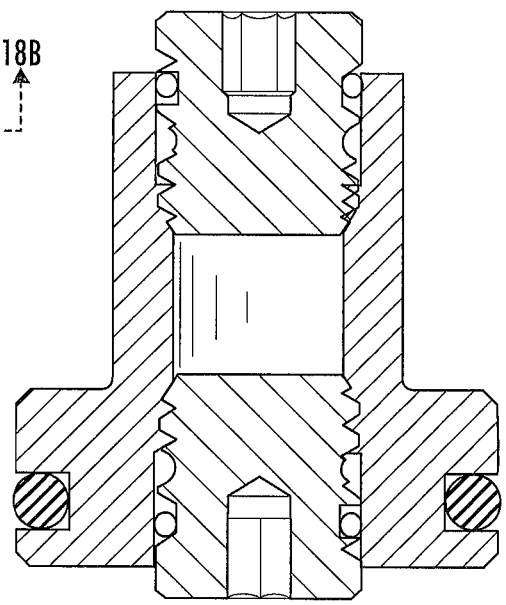

FIG. 18B— Depicts the assembled T-slot locator in section view.

Figure 18C:
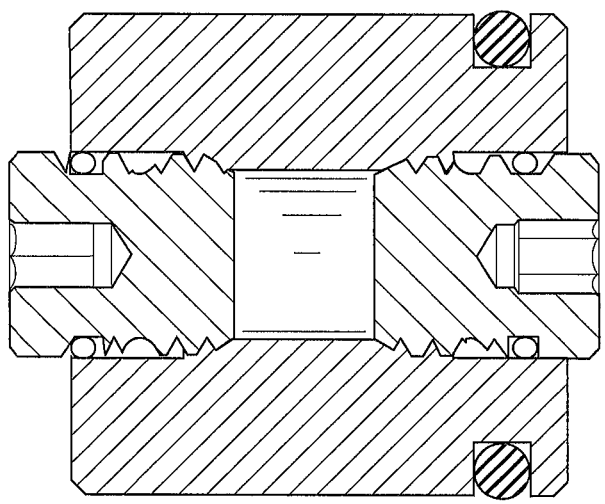

FIG. 18C— Depicts the assembled T-slot locator in section view.

Figure 18D:
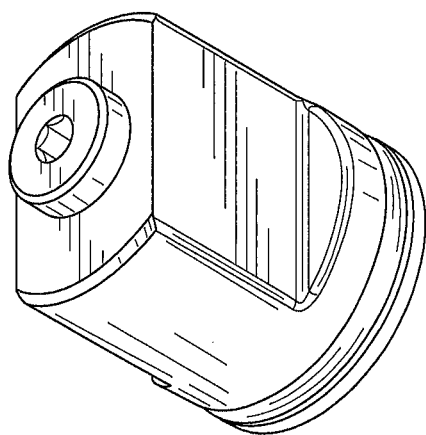

FIG. 18D— Depicts the assembled T-slot locator in trimetric view.

FIGS. 19A-21D— Depict a novel locating device (T-slot locator slider) that consists of a biasing member and a retractable dowel pin. The preferred embodiment of the biasing member will fit the width of the accepting T-slot and supply a radii that matches the outer diameter of the T-slot fastener. The purpose of this device is to precisely locate the T-slot fastener by engaging the locating counter-bored holes in the base of the T-slot. Like the T-slot locator, this devise incorporates a precise counter-bore and thread combination to facilitate the use of a retractable dowel pin. When lowering the retractable dowel pin, the biasing member is moved against the T-slot fixture, holding the T-Slot locator firmly in place. This is not the only embodiment which can serve this purpose. For example, there could be two radii locating surfaces that would facilitate locating two T-slot fasteners at the same time.

Figure 19A:
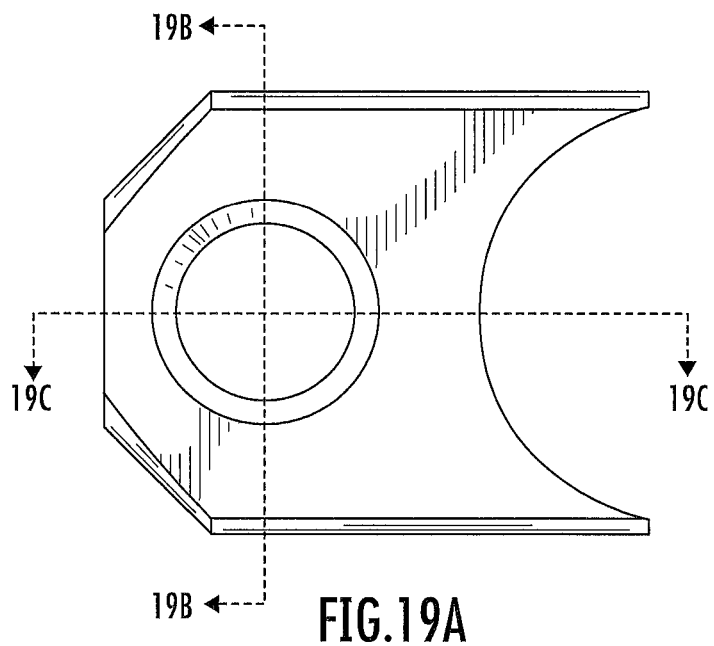

FIG. 19A— Depicts the biasing member in the top view.

Figure 19B:
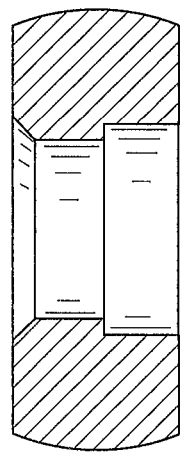

FIG. 19B— Depicts the biasing member in the section view.

Figure 19C:
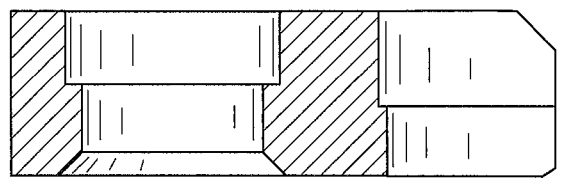

FIG. 19C— Depicts the biasing member in the section view.

Figure 19D:
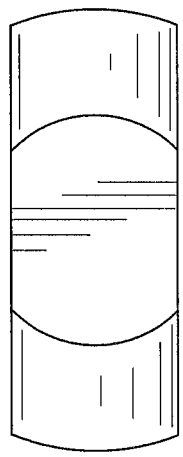

FIG. 19D— Depicts the biasing member in side view.

Figure 19E:
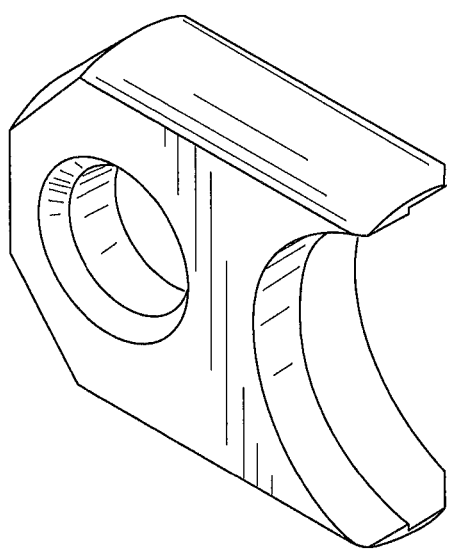

FIG. 19E— Depicts the biasing member in trimetric view.

Figure 20A:
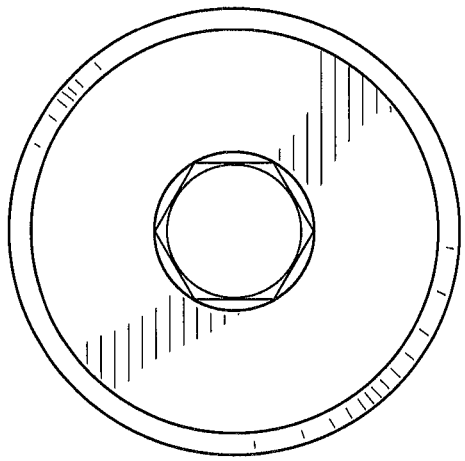
Figure 20B:
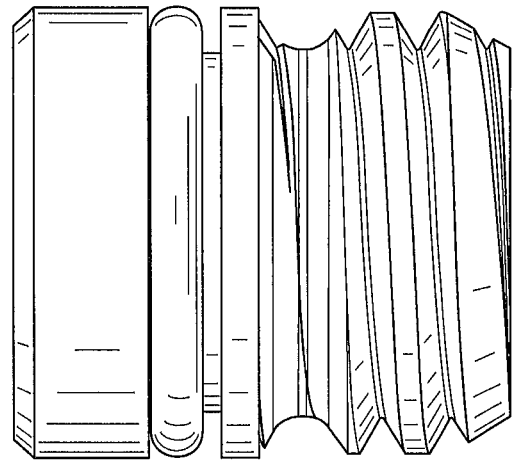
Figure 20C:
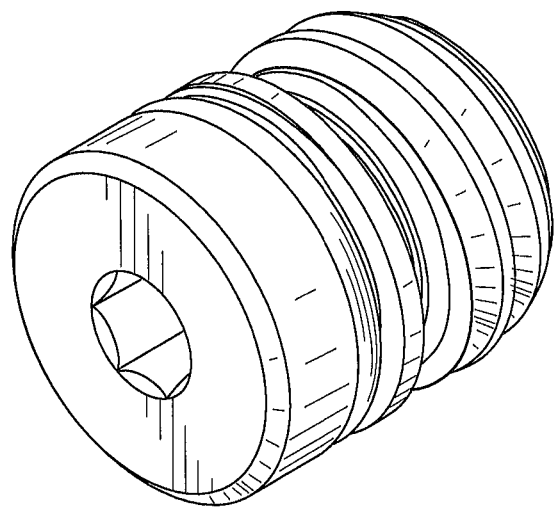

FIGS. 20A, 20B, 20C— Depict the retractable dowel pin which consists of a locating shoulder; drive feature (shown as a hex but may include other features) on either end, or both; threads; and O-ring. The retractable dowel pin, when screwed into a multi-purpose hole (defined as a bored plus threaded hole) provides exact location to a secondary object.

FIG. 21A— Depicts the assembled T-slot locator slider in top view.

FIG. 21B— Depicts the assembled T-slot locator slider in section view.

FIG. 21C— Depicts the assembled T-slot locator slider in trimetric view.

FIG. 21D— Depicts the assembled T-slot locator slider in trimetric view.

FIGS. 22A, 22B, 22C, 22D, 22E, 22F— Depict the assembled modular T-slot fixture incorporating the T-Slot fastener and T-Slot locator to locate/hold a vise product—

Top View. This particular application facilitates the ability to rapidly, repeatably quick-change the vise on/off the T-Slot fixture.

Figure 22A:
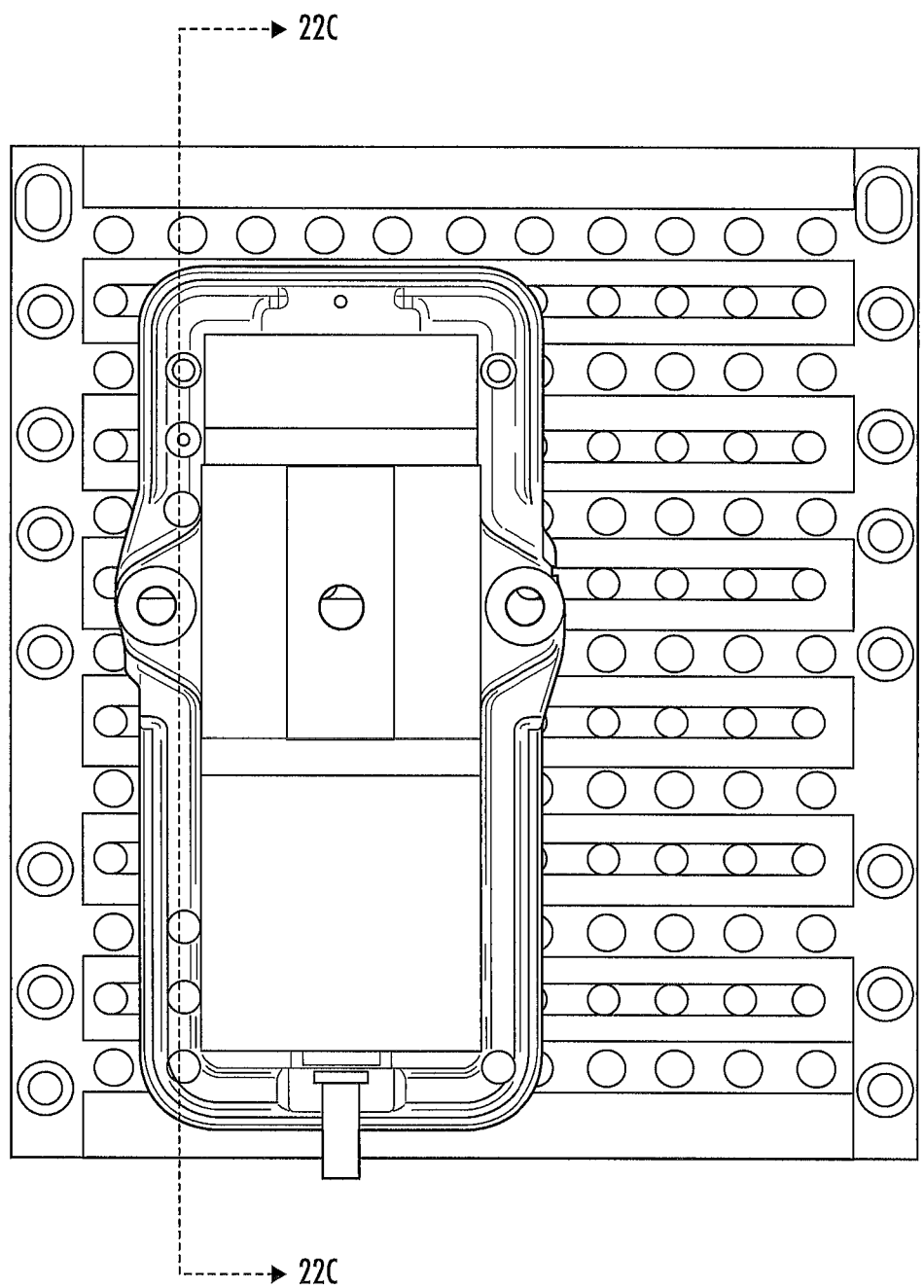

FIG. 22A— Depicts the assembled T-slot locator application in top view.

FIG. 22B— Depicts the assembled T-slot locator application in side view.

FIG. 22C— Depicts the assembled modular T-slot fixture application in section view. Several features of this novel concept are visible in this view. The magnified views (FIG. 22D, 22E) are even more descriptive. Here shown is the representation of several of these products in use: The T-Slot fastener, the T-Slot locator, and the retractable dowel pins in the upper slots.

FIG. 22D— Depicts the assembled T-slot locator application in magnified section view.

FIG. 22E— Depicts the assembled T-slot locator application in magnified section view.

FIG. 22F— Depicts the assembled T-slot locator application in trimetric view.

FIGS. 23A, 23B, 23C, 23D— Depict the assembled modular T-slot fixture incorporating the T-Slot fastener and T-Slot locator to locate/hold a vise product. This particular application facilitates the ability to rapidly, repeatably quick-change specialized modular vises that require the slot in the top of the fixture, on/off the T-Slot fixture.

Figure 23A:
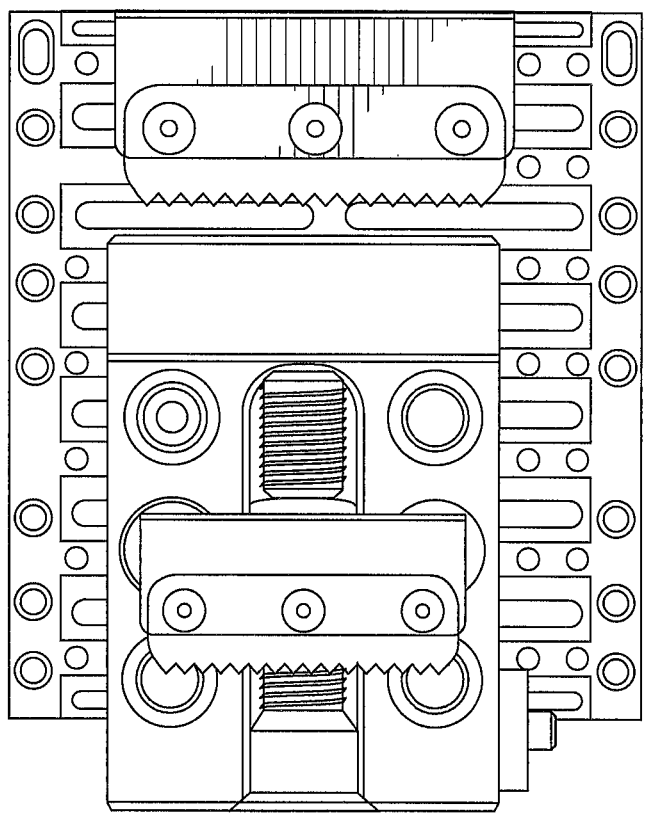

FIG. 23A— Depicts the assembled T-slot locator application in top view.

Figure 23B:
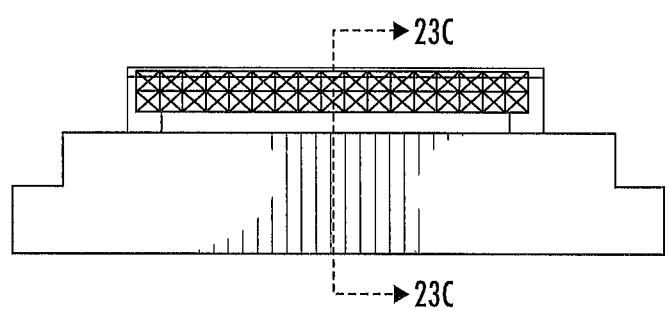

FIG. 23B— Depicts the assembled T-slot locator application in side view.

Figure 23D:
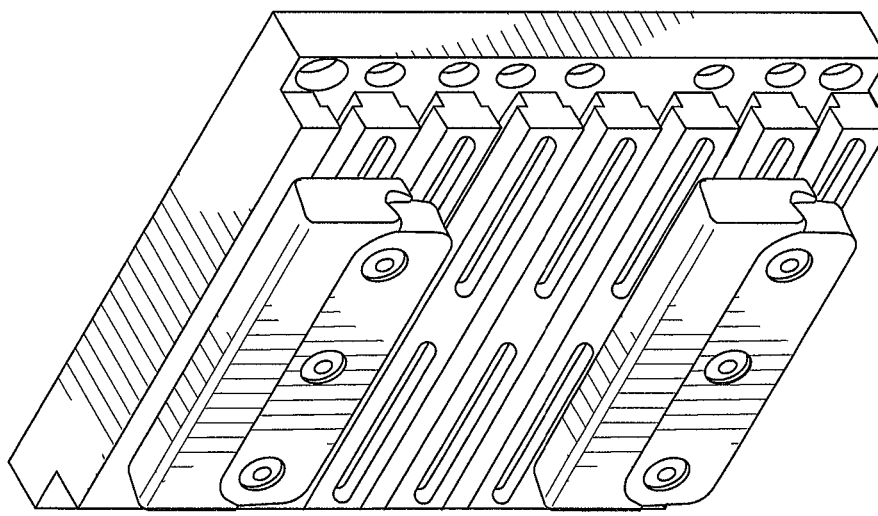
Figure 23C:
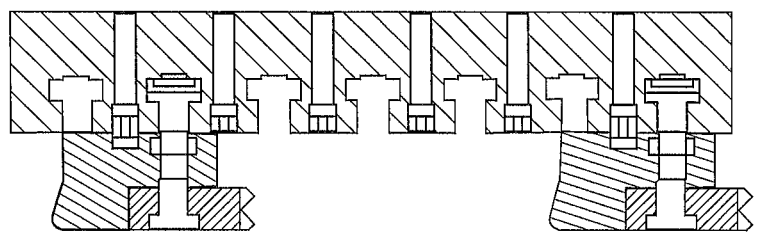

FIG. 23C— Depicts the assembled modular T-slot fixture application in section view.

FIG. 23D— Depicts the assembled T-slot locator application in trimetric view.

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION

Illustrative embodiments of the apparatus and method are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of the present application will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

An improved vise system described herein provides digital feedback to the user through the use of sensors configured to measure the clamping force provided between a fixed base and an adjustable base. The fixed base utilizes strain gages to measure an amplitude of forces applied to the fixed base through a working member from the adjustable base. The adjustable base utilizes a bi directional worm screw to apply a linear force to the working member relative to the fixed base. Each element in the system is positive located. "Positively locating" is defined as locating the element, such as an adjustable vise, in all three axis. A whole vise is created by pairing an adjustable base vise with a fixed base vise so that a distance between the grippers of the adjustable base vise and fixed base vise can be adjusted by moving part of the adjustable base vise.

The terms "precision location" and "precision locating" are used herein. Precision location combines the concepts of accuracy and precision to indicate a situation in which something is reliably located repeatedly. These terms refer to the ability to locate something accurately, in such a way that features that are to be made based upon that location can be depended upon to be in that location over and over again (repeatedly). Accuracy refers to the positional tolerance when compared to theoretical exact positions. The closer the positional tolerance is to theoretical exact positions, the more accurately the piece is located. The more frequently a piece is placed in that position of accuracy indicates its preciseness. The tooling products disclosed herein are used to accurately and precisely change pieces, tools, plates, objects rapidly and repeatedly. This precision location is necessitated by the tolerances required for modern products. It is noted that although tooling and machining are discussed throughout the present application, the vise members, fixture plate, fasteners, and other aspects are applicable to any number of systems and uses involving linear forces, such as in woodworking, metalworking, vacuum vises, plumbing, diemaking, tool sharpening, jewelry, tying flies, blacksmith vise, rigging, and combinations thereof.

Figure 1:
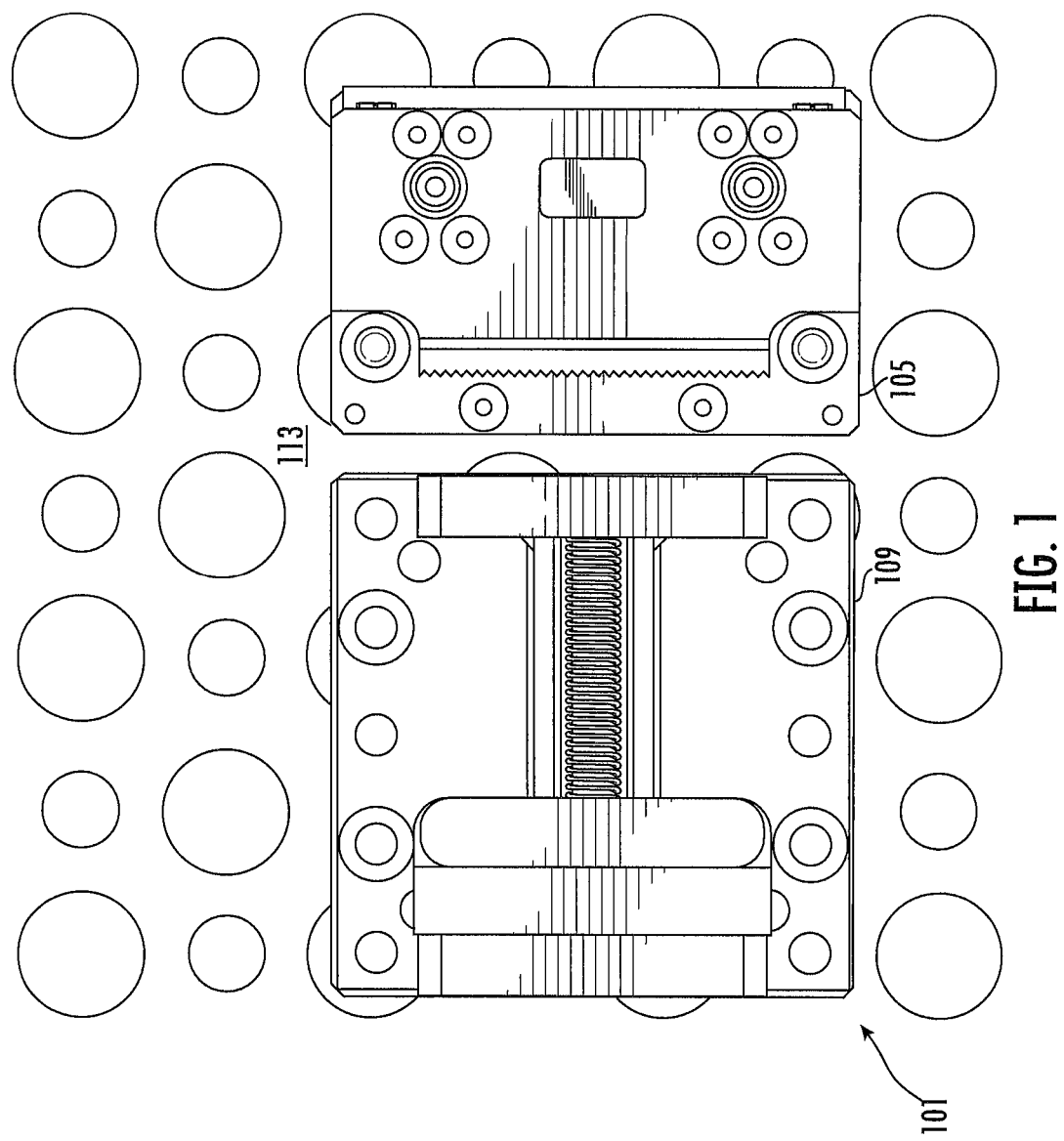
FIG. 1 is a top view of an improved vise system in accordance with a preferred embodiment of the present application.
Figure 2A:
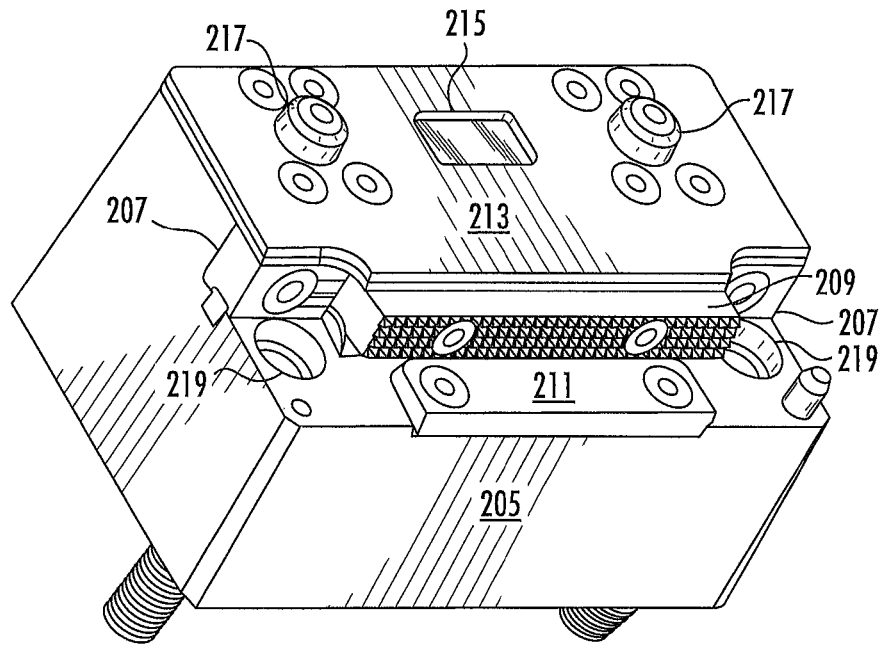
FIG. 2A is a perspective view of a fixed vise in accordance with a preferred embodiment of the present application.
Figure 2B:
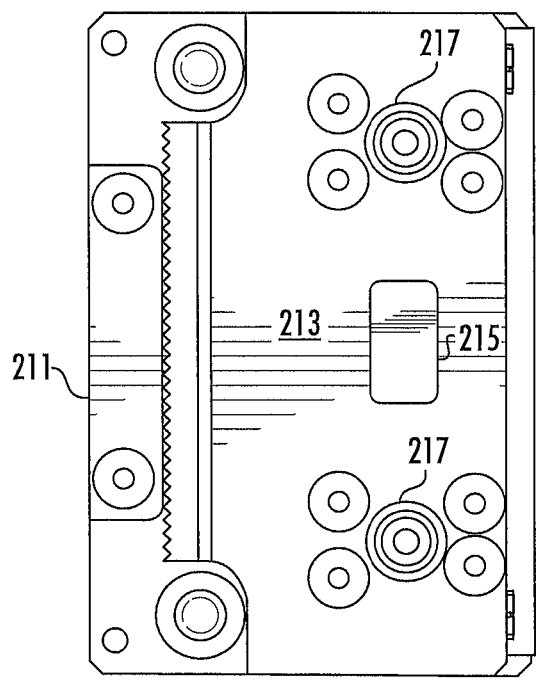
FIG. 2B is a top view of a fixed vise in accordance with a preferred embodiment of the present application.
Figure 2C:
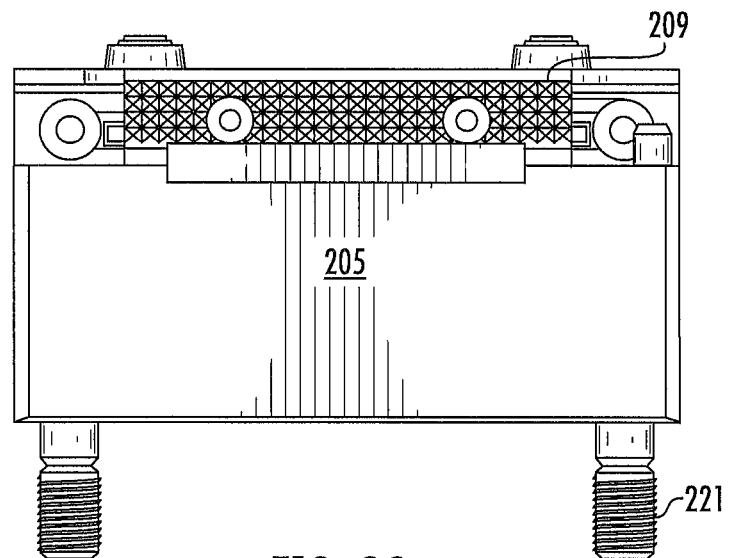
FIG. 2C is a front view of a fixed vise in accordance with a preferred embodiment of the present application.
Figure 2D:
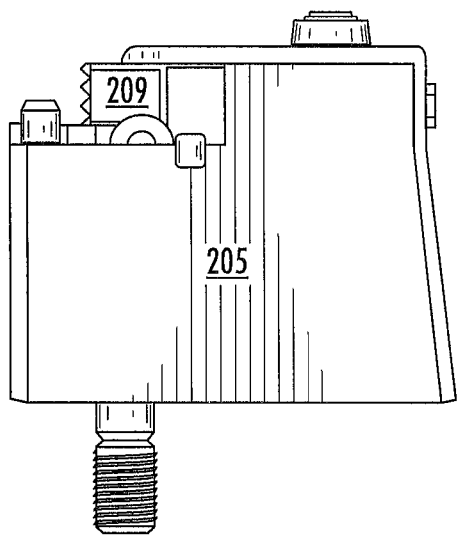
FIG. 2D is an end view of a fixed vise in accordance with a preferred embodiment of the present application.
Figure 3B:
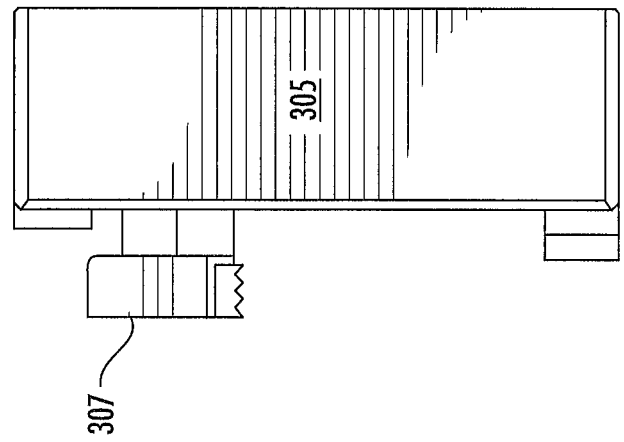
FIG. 3B is an end view of an adjustable vise in accordance with a preferred embodiment of the present application.
Figure 3A:
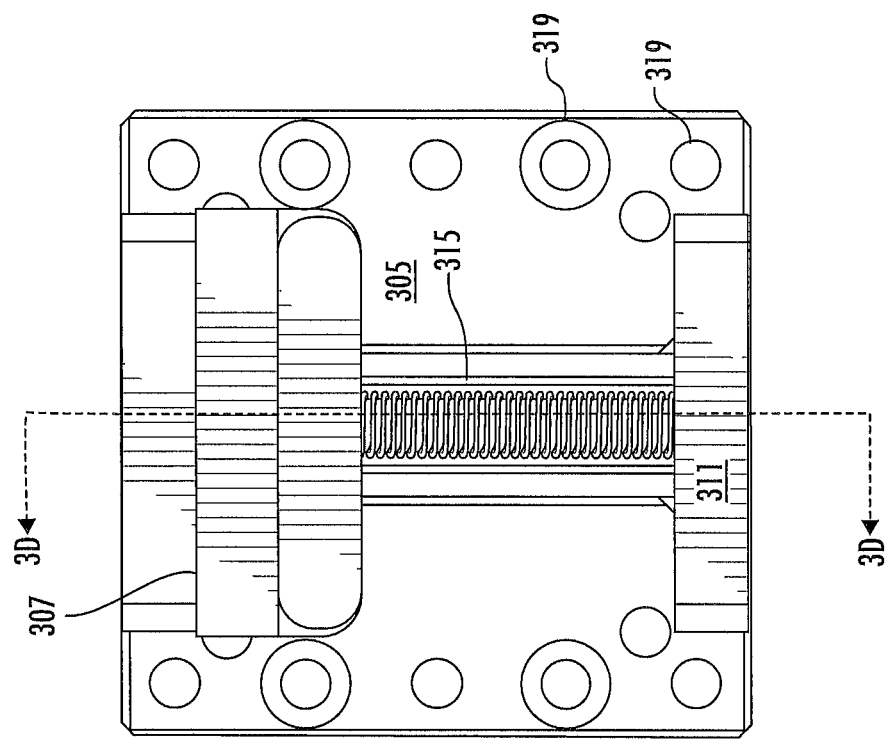
FIG. 3A is a top view of an adjustable vise in accordance with a preferred embodiment of the present application.
Figure 3D:
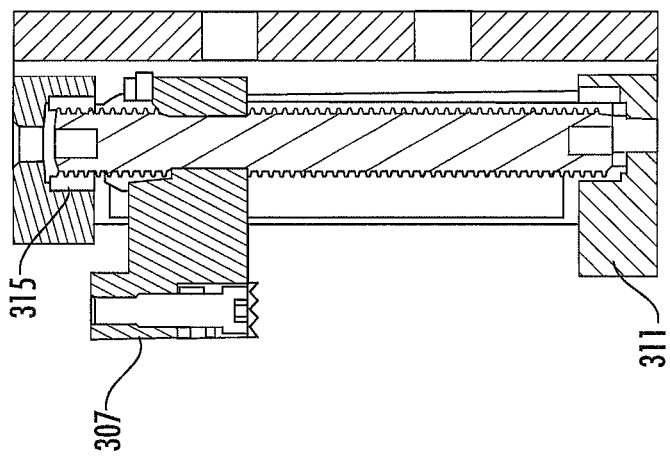
FIG. 3D is a section view of an adjustable vise taken along Line 3D-3D in accordance with a preferred embodiment of the present application.
Figure 3C:
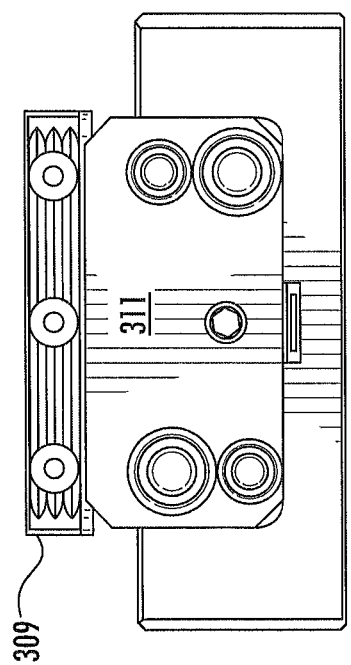
FIG. 3C is a front view of an adjustable vise in accordance with a preferred embodiment of the present application.

The improved system is modular and allows users to move various elements in the system to accommodate working materials without having a fixed opening. Referring now to FIG. 1, a top view of the improved vise system is illustrated. System 101 is comprised of a fixed vise 105, and an adjustable vise 109, both retained on a fixture plate 113. The fixed vise 105 can be moved relative to the adjustable vise 109 on the fixture plate 113 to hold parts or working materials as large as the fixture plate. Additionally supports can be utilized as needed between the fixed vise and the adjustable vise to support large spans. While illustrated as a fixed vise and an adjustable vise, it should be apparent that the system may be comprised of a pair of adjustable vises or some other combination of fixed and adjustable vises as needed to retain the object.

Referring now also to FIGS. 2A-2D, various views of a fixed vise 201 are illustrated. Fixed vise 201 is comprised of a base 205, a pair of spring blocks 207, a gripper 209, a wear pad 211, a cover plate 213, a screen 215 or display wired to and for a microcontroller located underneath the cover plate, a power supply (not shown), and a pair of input devises 217. Base 205 has a plurality of surfaces some parallel and some orthogonal to the plane of the fixture plate. Base 205 is configured to be mounted to a fixture plate and is comprised of a plurality of openings 219. Some of openings 219 are configured for a fastener 221 going from the top of the base through to screw into the fixture plate. Some of openings are configured for a fastener going from the fixture plate to be screwed into the base 205. Each of the spring block 207 has a first end fastened to the base 205 and a second end fastened to the gripper 209. As a force is applied to the gripper 209 the spring blocks are placed under strain.

Microcontroller is wired to a pair of strain gages located on one of the spring blocks 207 thereby forming a half bridge circuit capable of measuring force from tightening the adjustable vise relative to the fixed vise. A first strain gage is located on a first surface of the spring block and a second strain gage is located on a second surface of the spring block opposite the first surface. In an alternative embodiment each spring block uses a pair of strain gages wired to the microcontroller as a full bridge between the two spring blocks. The screen 215 preferably displays the force measured by the strain gages and features a preset system. The preset system allows users to input a certain force, such as one hundred pounds, and as the strain gages measure the preset force of one hundred pounds an alert is issued to the user. The alert preferably is a flashing screen, but may be a light emitting diode, a change in color in the screen, and/or an audible alarm. Furthermore, the output of the strain gage and or the output of the microcontroller may be used in a control loop to control a motorized screw drive system. For example, the user may set the system to apply only twenty-five pounds of force to retain a block and the motorized screw system would start tightening until the microcontroller measured the twenty-five pounds.

Preferably the input devises 217 are a first and second push button switch. The input devises provide control to the microcontroller by the user. For example power to the microcontroller from the power supply can be turned off and on. The user can adjust alerts, limits, units, and calibration data by actuation of the switch. Furthermore, the system further comprises a wired or a wireless link such that the microcontroller can be coupled to a remote controller and or datalogger. Recording with a datalogger the forces applied to working materials or parts over time generates a log for quality control. For example, a smartphone can be used as a remote viewing devise to provide an additional screen in addition to the screen 215 and can also be used to record the forces measured over time.

Referring now also to FIGS. 3A-3D, various views of an adjustable vise 301 are illustrated. Adjustable vise 301 is comprised of a base 305, a pusher 307, a gripper 309, a wear pad 311, and a drive screw assembly 315. Base 305 is configured to be mounted to a fixture plate and is comprised of a plurality of openings 319. Base 305 has a plurality of surfaces some parallel and some orthogonal to the plane of the fixture plate. Some of openings 319 are configured for a fastener going from the top of the base through to screw into the fixture plate. Some of openings 319 are configured for a fastener going from the fixture plate to be screwed into the base 305. The openings 319 are configured to allow the base 305 to be mounted to at least 2 different tables having varied hole patterns in the table. Pusher 307 is angled and located in a t-slot of the base, the t-slot is cut at a downward angle relative to the rest of the base, typically 1 degree relative to the fixture plate, as clearly shown in the section view 3D. Therefore the pusher translates in a non-parallel plane relative to the fixture plate. Pusher 307 is rotationally coupled to the drive screw assembly so that as the drive screw assembly is rotated by the user the pusher move along an axis defined by the t-slot. The drive screw assembly typically is rotated by insertion of a hex key in either end of drive screw assembly and turning the hex key. Wear pad 311 is held to the base by fasteners and is replaceable. Wear pad 311 is the preferred location on the adjustable vise to support the part to be retained. The gripper 309 is held to the pusher by a set of fasteners. Gripper 309 is reversible and has a side with grooves as shown and a smooth side not shown.

During use of the modular pressure application system the user couples at least one of the vises to the fixture plate. Typically the fixed vise is coupled to the fixture plate first. Then the user couples the adjustable vise a distance away from the fixed vise. The distance away is calculated to allow for the securement of the item to be held.

The part is placed on the wear pads of both vises. The user then rotates the drive screw to apply pressure to the item being held between the adjustable vise and the fixed vise. As a force is applied to the gripper of the fixed vise the gripper applies strains to the spring blocks coupled to the gripper of the fixed vise. The strain gages located on the spring blocks then measure the strains in at least one of the spring blocks. The output of the strain gage is indicated to the user, typically on a screen, such that the user can measure the force applied to the item being held as the drive screw is being turned.

Figure 4:
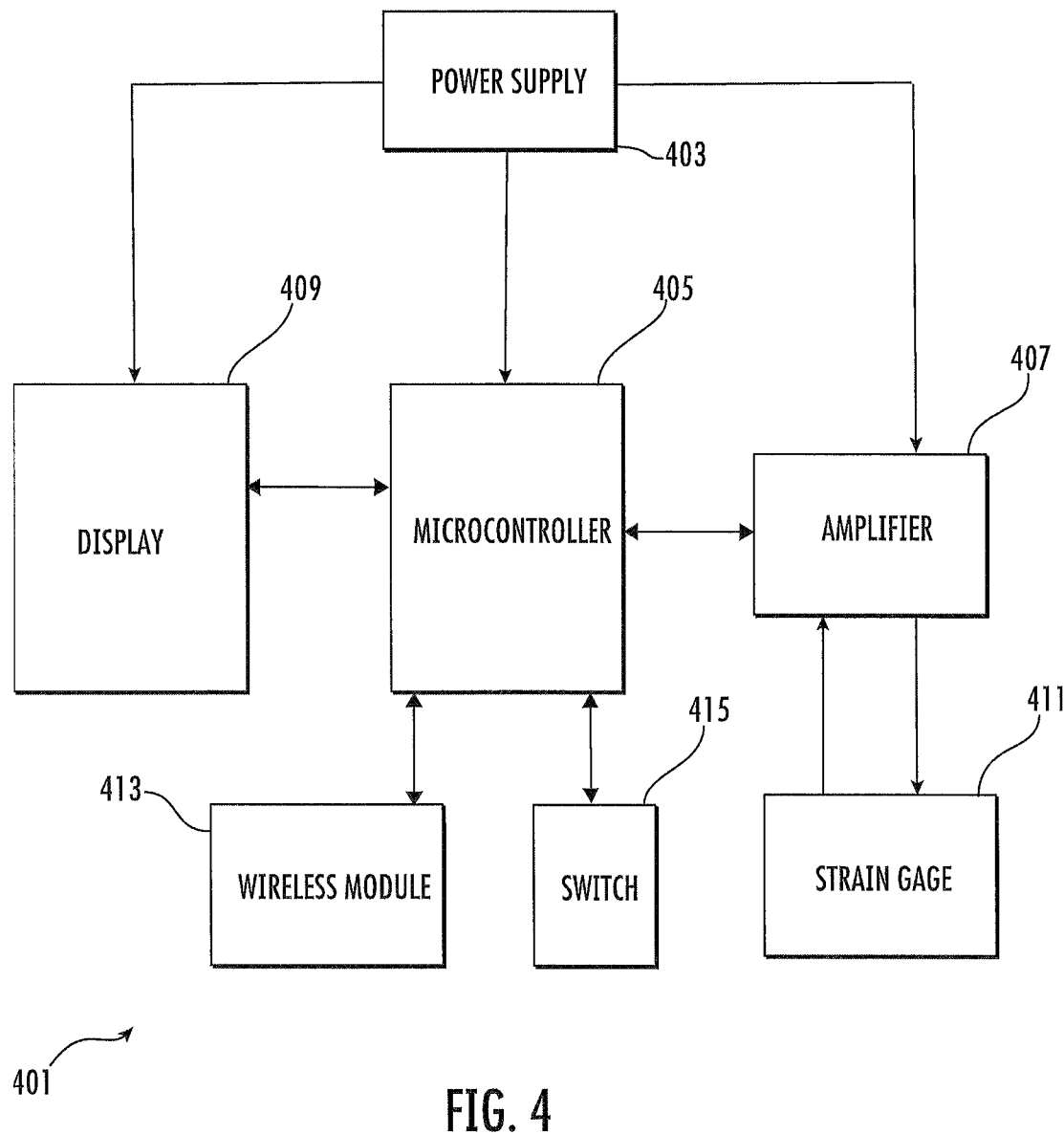
FIG. 4 is a schematic of a modular pressure application system in accordance with a preferred embodiment of the present application.

Referring now also to FIG. 4 a schematic of the Modular Pressure Application System is illustrated. System 401 is comprised of power supply 403, a microcontroller 405, an amplifier 407, a display 409, a strain gage 411, a wireless module 413, and a switch 415. Power supply 403 is typically a direct current power source, such as a nine volt battery, and provides power for the display 409, the microcontroller 405, and the amplifier 407. The power supply 403 also provides power for the wireless module in those embodiments with a wireless module. The amplifier 407 provides a supply voltage to the strain gage 411 and amplifies the resulting output voltage from the strain gage. The microcontroller 405 measures the amplified output voltage from the amplifier and creates a visual indicator on the display 409. Visual indicator is preferably textual but may be a bar chart or other indication of force applied. Switch 415 is coupled to the microcontroller and allows the user to select menus and zero the system as needed. Microcontroller 405 generates the digital display for the user on the display 409 my converting the analog output of the strain gage into a digital measurement configured for a liquid crystal screen such as display 409.

Figure 5:
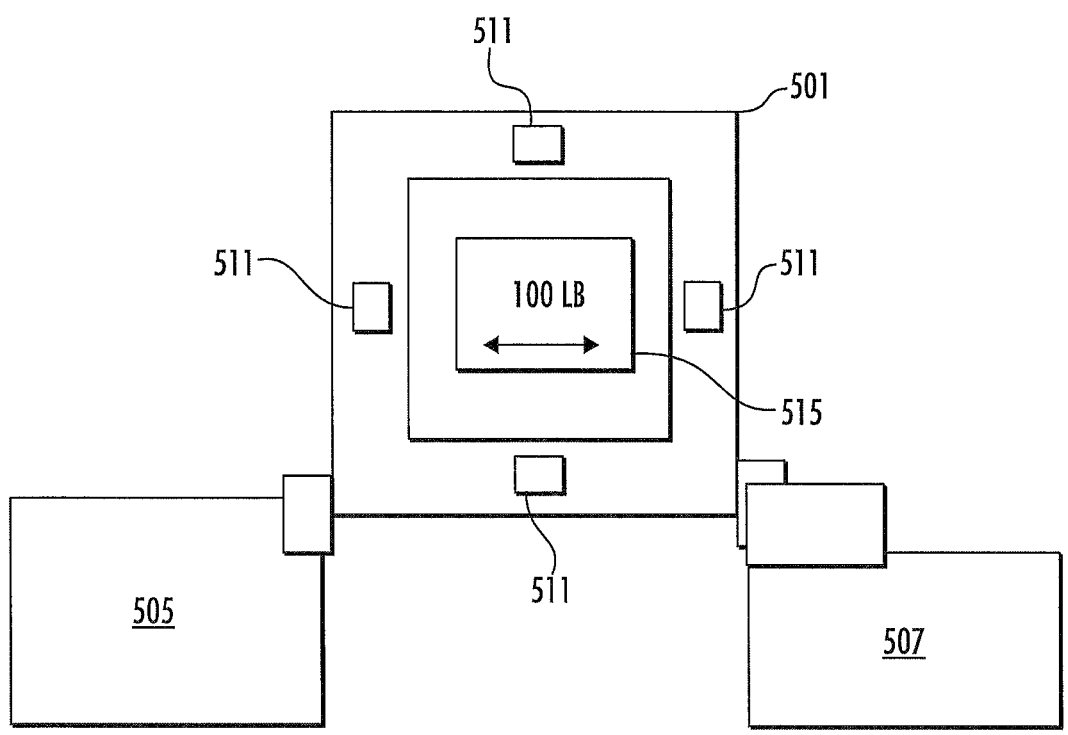
FIG. 5 is a front view of a calibration block in accordance with a preferred embodiment of the present application.

Referring now also to FIG. 5 a side view of a calibration block of the Modular Pressure Application System is illustrated. Calibration block 501 is secured between a fixed vise 505 and an adjustable vise 507. Calibration block 501 is comprised of a calibrated system of strain gages 511, a power supply, a controller, and a display 515. Calibration block is remotely calibrated in a lab so that the display accurately indicates the applied forces. The user places the calibration block in the modular pressure application system and engages the adjustable vise 507 and then compares the display 515 of the calibration block to the display of the fixed vise to determine the offset of the fixed vise. Therefore the fixed vise does not have to be returned to a calibration lab as the calibration can be done in the field.

Figure 6A:
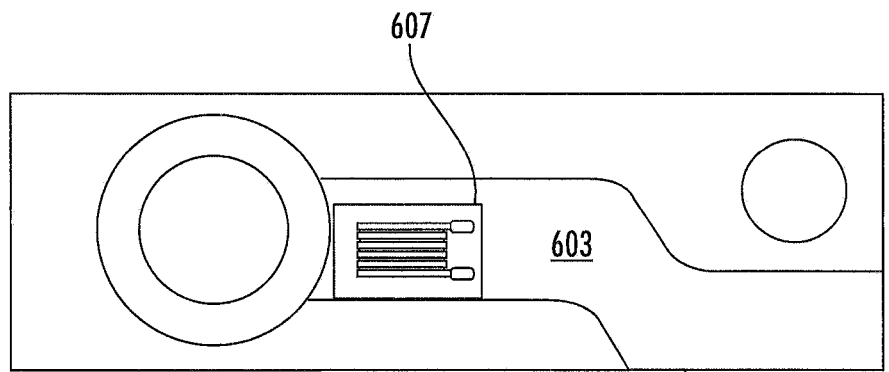
FIG. 6A is a front view of a spring block in accordance with a preferred embodiment of the present application.
Figure 6B:
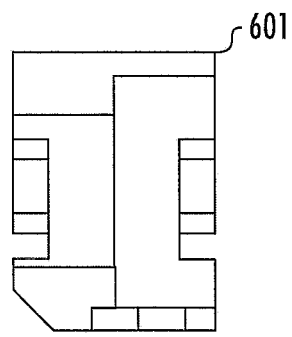
FIG. 6B is an end view of a spring block in accordance with a preferred embodiment of the present application.
Figure 6C:
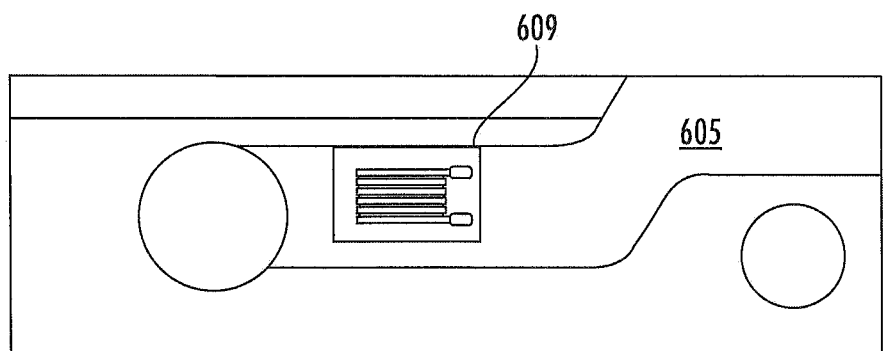
FIG. 6C is a back view of a spring block in accordance with a preferred embodiment of the present application.
Figure 7B:
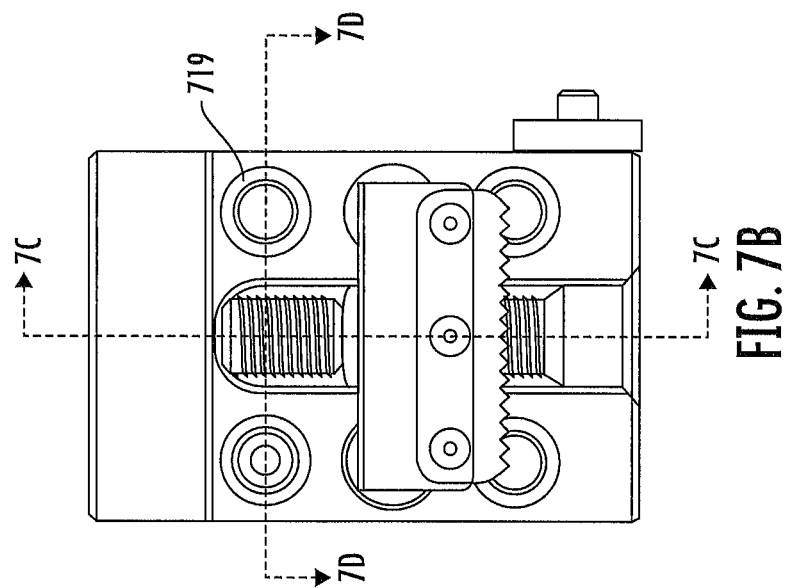
FIG. 7B is a top view of an adjustable vise in accordance with a preferred embodiment of the present application.
Figure 7A:
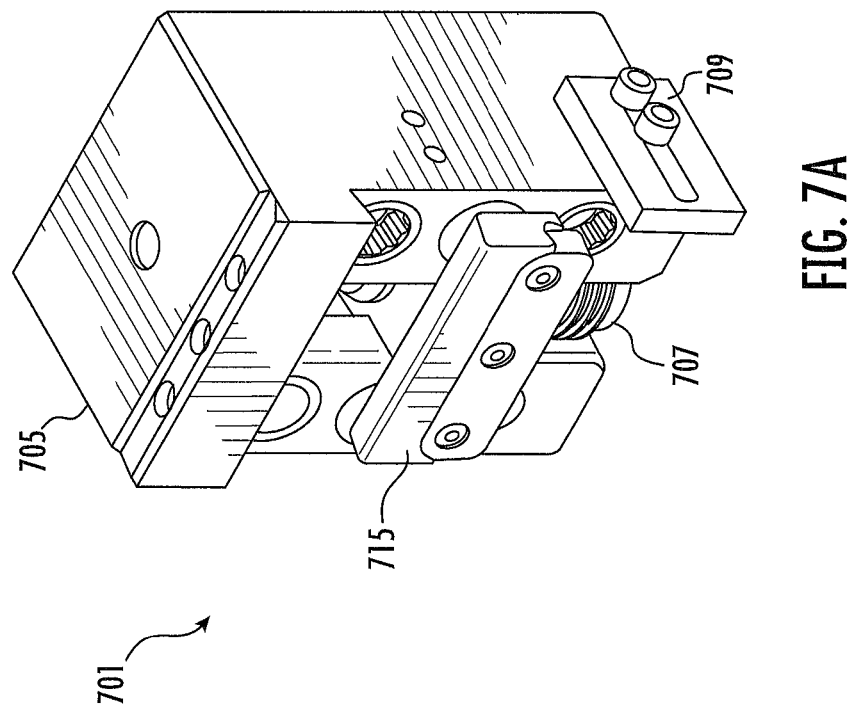
FIG. 7A is a perspective view of an adjustable vise in accordance with a preferred embodiment of the present application.
Figure 7D:
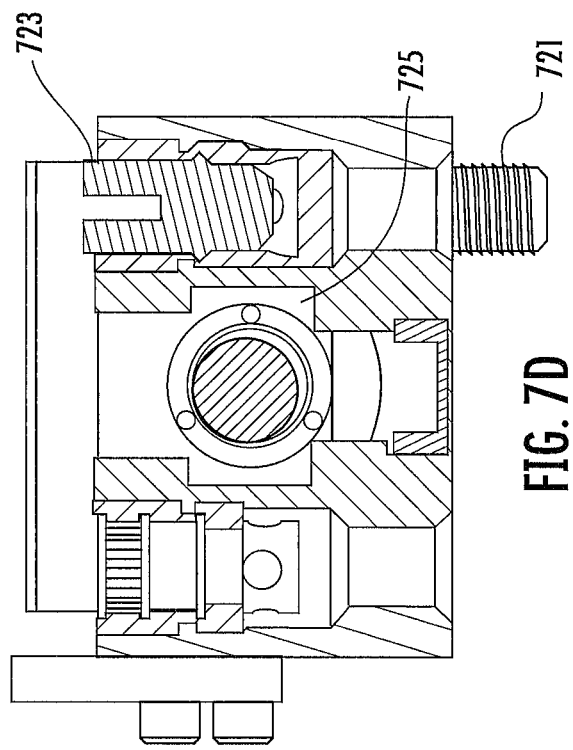
FIG. 7D is a section view of an adjustable vise taken along Line 7D-7D in accordance with a preferred embodiment of the present application.
Figure 7C:
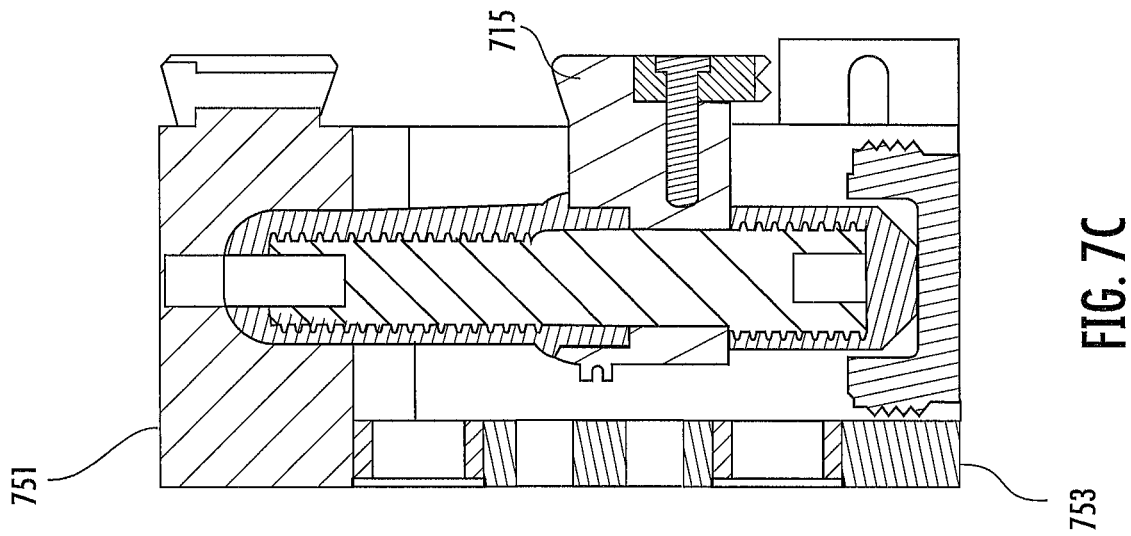
FIG. 7C is a section view of an adjustable vise taken along Line 7C-7C in accordance with a preferred embodiment of the present application.
Figure 7F:
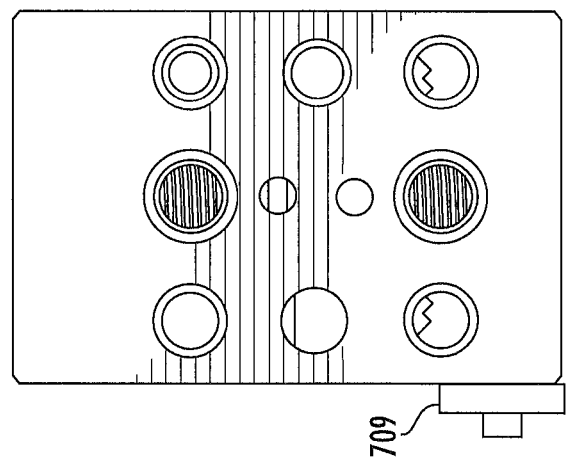
FIG. 7F is a bottom view of an adjustable vise in accordance with a preferred embodiment of the present application.
Figure 7E:
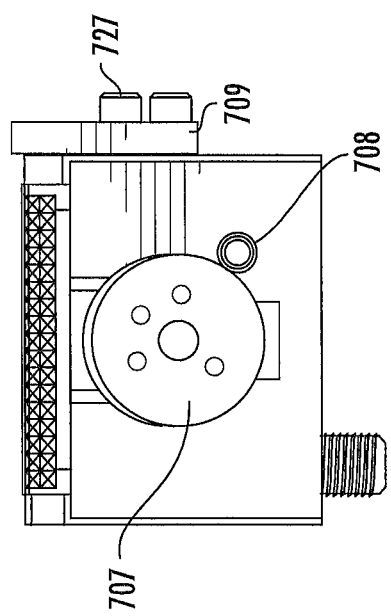
FIG. 7E is a front view of an adjustable vise in accordance with a preferred embodiment of the present application.
Figure 8B:
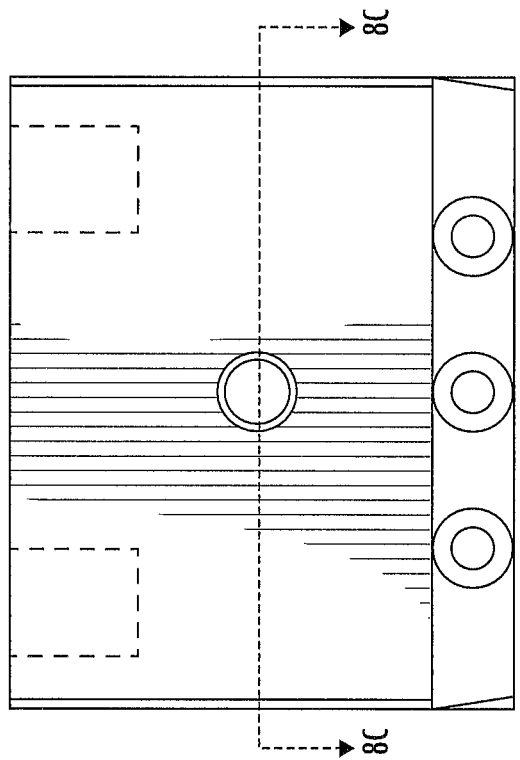
FIG. 8B is a back view of an adjustable vise member in accordance with a preferred embodiment of the present application.
Figure 8A:
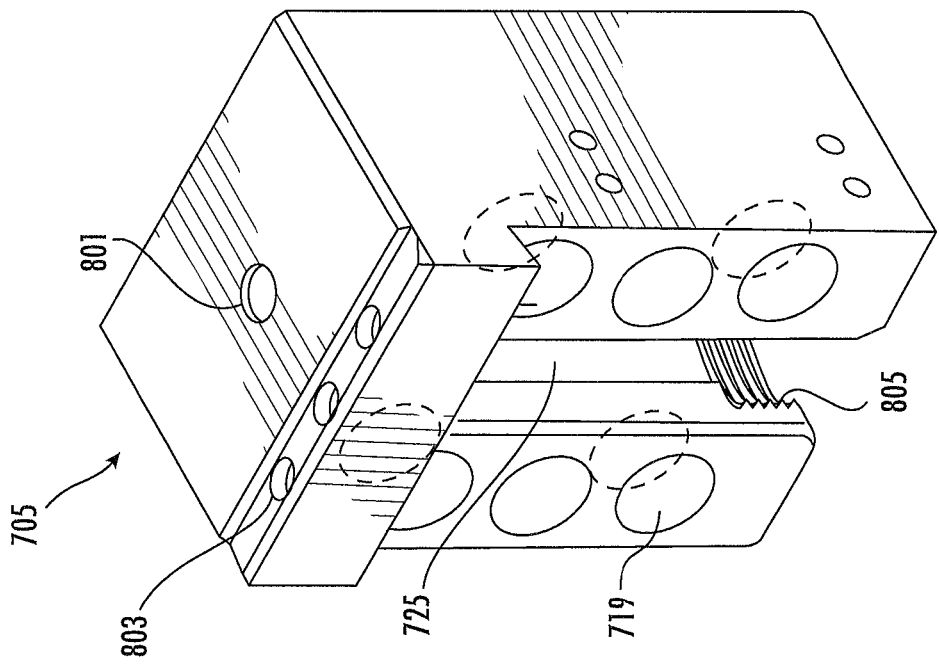
FIG. 8A is a perspective view of an adjustable vise member in accordance with a preferred embodiment of the present application.
Figure 8D:
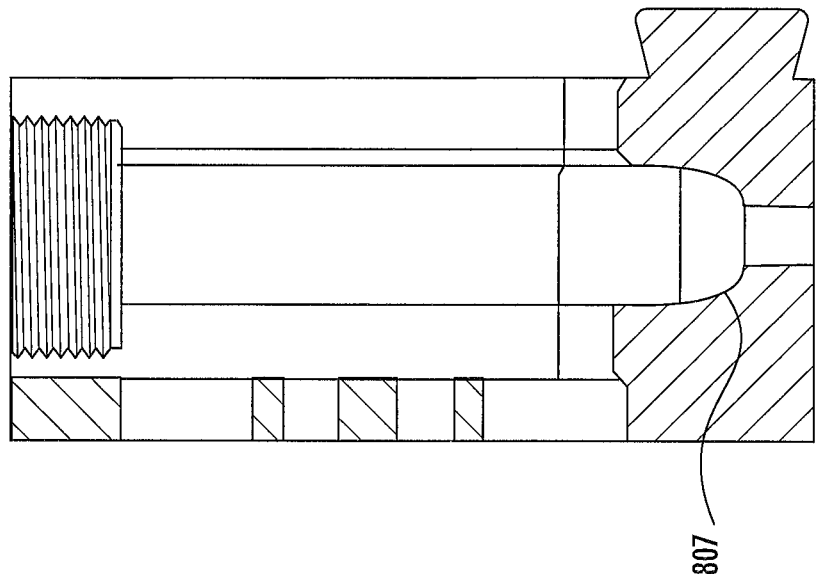
FIG. 8D is a section view of an adjustable vise member taken along Line 8D-8D in accordance with a preferred embodiment of the present application.
Figure 8C:
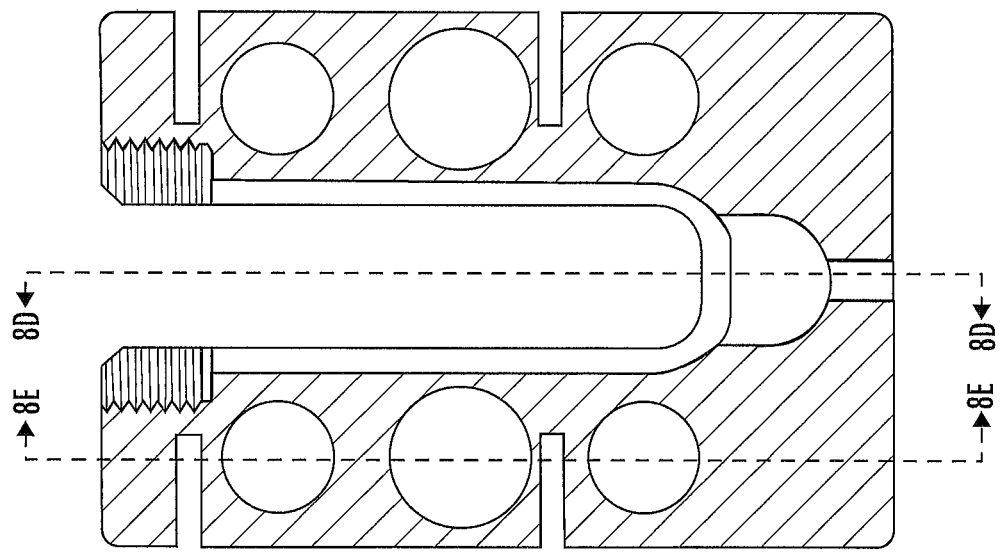
FIG. 8C is a section view of an adjustable vise member taken along Line 8C-8C in accordance with a preferred embodiment of the present application.
Figure 8F:
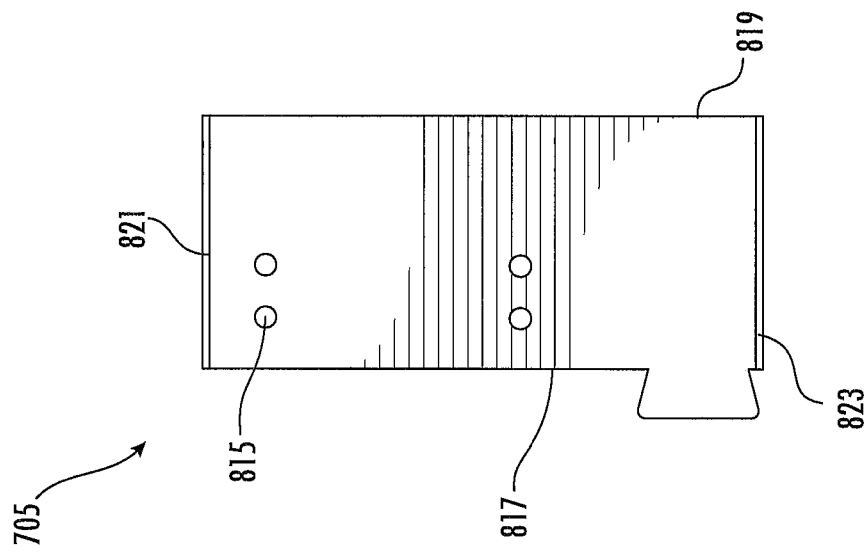
FIG. 8F is an end view of an adjustable vise member in accordance with a preferred embodiment of the present application.
Figure 8E:
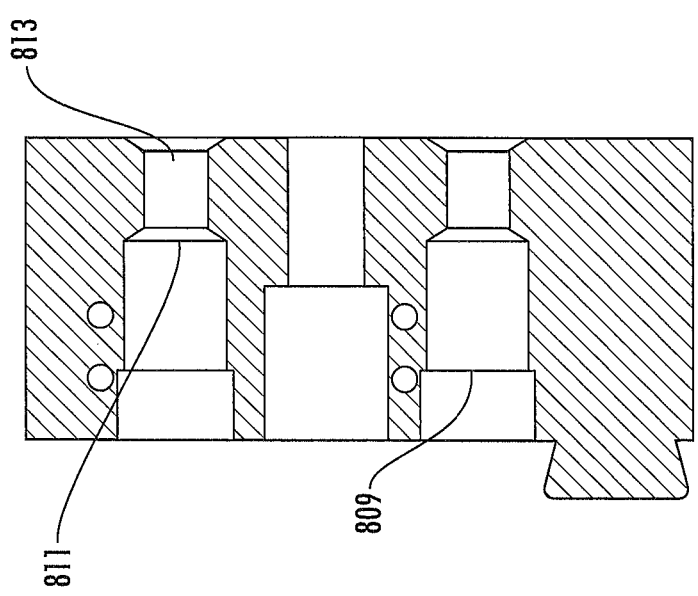
FIG. 8E is a section view of an adjustable vise member taken along Line 8E-8E in accordance with a preferred embodiment of the present application.

Referring now also to FIG. 6 various views of a spring block of the Modular Pressure Application System is illustrated. Spring block 601 is comprised of a first surface 603 and a second surface 605. Spring block 601 further comprises a first strain gage 607 located on the first surface and a second strain gage 609 located on the second surface 605. Both the first 603 and second surfaces 605 are formed by creating two channels in the spring block. The channels provide a recessed location for the strain gage and the wiring connecting the strain gages.

The improved modular vise system standardizes the forces that are applies to the working material for the specific purpose of managing the internal stress applied to the material or part being held.

Referring now also to FIGS. 7A-7F in the drawings, a perspective view of an adjustable vise 701 is illustrated. In a preferred embodiment, the adjustable vise 701 is comprised of a base member 705, a keeper assembly 707, retention pin 708, a stop member 709, and a pusher assembly 715. The base member 705 has a plurality of surfaces some parallel and some orthogonal to the plane of a fixture plate. The adjustable vise member 701, alone, together with another adjustable vise member, or together with a fixed vise member are removably connected and precisely located on a fixture plate. In other embodiments, the adjustable vise member(s) 701 and/or the fixed vise member are used with a conventional base plate (not shown) and/or a modular base plate, such as a base plate without T-slots and elongated slots that includes openings for threaded screws, bolts, and/or other conventional fasteners.

In a preferred embodiment, adjustable vise member 701 is adjusted to secure a machineable part between it and another vise member. The adjustment occurs using either end of a rotationally attached, keyed drive screw. Preferably, one or more machinable parts are secured between the pusher and a dovetail ledge of the same vise and/or between the pusher and another dovetail ledge of another vise member to prevent movement along three axes during machining of the part.

In a preferred embodiment, the base member 705 is configured to be mounted to the fixture plate, or to another vise member via stacking, and is comprised of a plurality of openings 719. Some of openings 719 are configured for one or more locators going from the base member 705 through to screw into the fixture plate. Some of openings 719 are configured for a locator going from the fixture plate to be screwed into the base member 705.

Preferably, the openings 719 are configured to retain a plurality of locators comprising a plurality of locating dowel pins and/or a plurality of threaded bushings. For example, a retractable dowel pin 721 may be housed within a fixture plate beneath the adjustable vise 701, such that when an opening 719 is above the retractable dowel pin a hex tool, a ten-point driver tool, an Allen wrench, or a screw driver is used to rotate the retractable dowel pin 721, raising it up from the fixture plate and into the opening 719. The retractable dowel pin 721 thereby prevents movement of the adjustable vise 701 along at least two axes, such as the x- and y- axes. The openings 719 of the adjustable vise 701 may also be configured for conventional fasteners, such as a conventional dowel, bolt, or screw.

In a preferred embodiment, the adjustable vise 701 has six openings 719, with at least two openings 719 configured for retractable dowel pins and at least four openings 719 configured for threaded bushings. Other fastener and opening arrangements are encompassed herein. For example, the adjustable vise could have four dowel pin openings 719 and two bushing openings 719; or, the adjustable vise could have three openings for dowel pins and three openings for threaded bushings. Other opening 719 arrangements and locations relative to the base 705 of the adjustable vise 701 are envisioned and encompassed herein. Also, the number, dimensions, and texture (e.g., smooth vs. threaded) of the openings 719 may also change based on the dimensions of the adjustable vise 701 and/or the part it will be securing for machining.

In at least one embodiment, two fasteners are within a single opening 719 for securing from both the top and the bottom of the adjustable vise 701. For example, a first fastener 721 comprises a retractable bolt or dowel pin assembly extending from a bottom of the adjustable vise 701, or extendably housed in a fixture plate. The first fastener 721 includes a cylindrical housing having an outer circumference and a first-end corresponding to the operating surface of the fixture plate. The fastener 721 has threads formed on the outer circumference of the housing to threadably restrain the adjustable vise 701. A hex-key or ten-point key cavity is formed within at least the fixture plate end of the cylindrical housing. Alternatively, both ends of the fastener 721 have a hex-key or ten-point driver cavity formed within them. Preferably, the second fastener 723 is a bushing and stud assembly for use in securing a workpiece or another vise to the top surface of the adjustable vise 701. The second fastener 723 includes a bushing comprising a cylindrical housing having an outer circumference and a first-end corresponding to the opening 719 within the top surface of the adjustable vise 701. Threads are formed on the outer circumference of the bushing housing. A stud cavity is formed within the cylindrical bushing housing with a first lower portion being threaded and a second upper portion of the cavity being configured as a stud passage. A stud or dowel pin having a first threaded end is passed through the stud passage and threadably retained in the lower portion of the stud cavity. Although the second fastener is depicted without a bias system, other embodiments include a bias system, such as a spring, disposed below the stud and the bushing housing. The bias system is operable to bias the threaded portion through the stud passage, and extend the stud above the surface of the adjustable vise 701 upon receiving rotation, such as a ¼ turn rotation. Additionally, although the stud of the second fastener 723 is shown having a top end that is smooth, alternatively the stud may have a top end that is threaded to restrain the workpiece or another vise.

Preferably, the first fastener 721 extending from the adjustable vise 701 is adjusted from the top surface of the adjustable vise 701, through opening 719. Alternatively, the first fastener is adjusted from a bottom or underside of the fixture plate by rotating the fastener through a hole or opening formed in the fixture plate. Preferably, the second fastener extending from or out of the top surface of the adjustable vise 701 is adjusted from the top of the vise 701. Alternatively, a through-passage is formed in the first fastener 721, enabling an adjusting access to the bottom end of second fastener 723 through the passage formed in the first fastener 721. Holes may be formed in the machinable part for securing the part to the vise 701 by way of the second fastener 723. Preferably, at least four fasteners are used to retain the part, and at least four fasteners are used to retain the vise, with at least two of the fasteners using threads and/or bushings. The openings 719 are configured to allow the base member 705 to be mounted to at least two different tables having varied hole patterns in the table.

The stop member 709 is retained by one or more threaded fasteners 727. Preferably, two threaded fasteners 727 retain the stop member 709 and are configured to sit within an elongated channel formed in the stop member 709 to enable dimensional adjustments to the stop member 709. The dimensional adjustments include adjusting a height of the stop member 709 that protrudes above or below a horizontal surface of the adjustable vise 701. Alternatively, the dimensional adjustments include adjusting a length of the stop member 709 extending horizontally from a side of the adjustable vise 701.

Preferably, a portion of the pusher assembly 715 is located or partially housed within a t-slot 725 formed or cut in the base member 705. Therefore, depending on the orientation of the adjustable vise 701, the pusher 715 translates orthogonally relative to t-slots formed in the fixture plate, or parallel to the t-slots formed in the fixture plate. The translation is from the distal end 751 to the proximal end 753, or visa-versa.

Referring now also to FIGS. 8A-8F in the drawings, the adjustable vise base member 705 is illustrated. The base member 705 is a unitary member, formed from a single piece of material, such as hardened tool steel. A length of the opening 719 formed in the base member 705 is orthogonal to a length of the t-slot 725 formed in the base member 705. A distal end of the base member 705 includes an access opening 801 for adjusting the drive screw of the pusher assembly 715 from the distal end. A ratio of the diameter of the opening 801 to the outer diameter of the drive screw is approximately 0.5 to 0.8, thereby providing sufficient grip and torque to the hex-tool used to rotate the drive screw.

Preferably, openings 803 are formed in a dovetail ledge of the base member 705 for passing through the dovetail ledge to the workpiece being held, to further anchor the workpiece. Alternatively, the openings 803 are threaded and are used for attaching a grooved or serrated surface to the dovetail ledge.

A circular, threaded opening 805 is formed in the base member 705 at the proximal end of the t-slot 725. The opening 805 is for securing the keeper assembly 707 to the base member 705. A rounded or beveled opening 807 is formed in the distal end of base member 705, adjacent opening 801, for a rotatable housing of the drive screw of the pusher assembly 715.

Preferably, the openings 719 have at least a first diameter and depth 809 and a second diameter and depth 811. Preferably, at least two openings 719 have a third diameter and depth 813. The diameter and depths of the openings 719 are formed or cut to accommodate conventional fasteners, such as a inch hex-bolt, as well as the retractable dowel pin and bushing and stud assemblies described herein.

Preferably, base member 705 includes openings 815 for retaining stop member pins. In a preferred embodiment, the openings 815 are threaded pairs of openings; however, smooth openings may also be used together with pins having a ball detent or other releasable retention means to secure the stop member 709 to the base member 705 in a manner that allows for adjusting the stop member 709 relative to top surface 817, bottom surface 819, front surface 821, and/or rear surface 823 of the base member 705.

Figure 9:
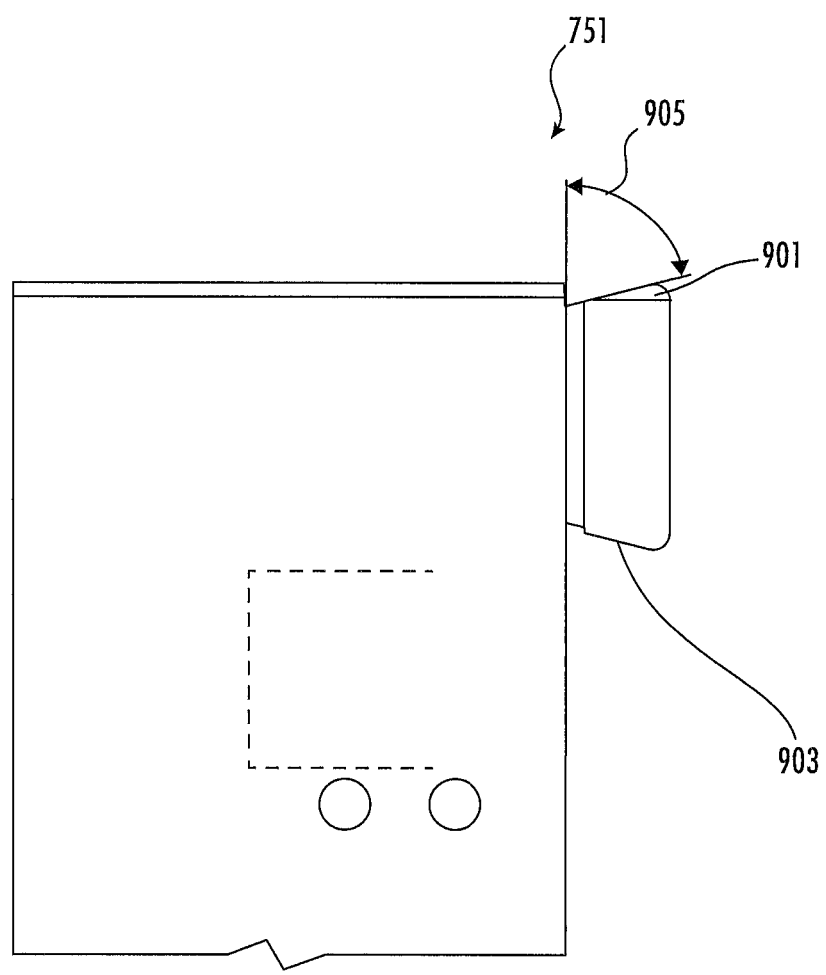
FIG. 9 is an exploded end view of an adjustable vise member in accordance with a preferred embodiment of the present application.

Referring now also to FIG. 9 in the drawings, an exploded view of the distal end 751 of the adjustable vise 701 is illustrated. The distal end 751 of the adjustable vise 701 includes two dovetail ledges, enabling the adjustable vise 701 to act as both a modular adjustable vise and a modular fixed vise. The first dovetail ledge 901 is disposed along a top, distal edge of the adjustable vise 701 in a plane that is collinear with the pressure application surfaces of the pusher and gripper. The second dovetail ledge 903 is disposed along a top, forward or proximal facing edge of the adjustable vise 701 such that ledge 903 opposes a surface of the pusher (FIG. 11 below) for retaining a part between the opposing surfaces. An angle 905 of the dovetail ledge is about a 65° to 85° angle. A second adjustable vise, having the same features as adjustable vise 701, is positioned behind or in front of the adjustable vise 701, where a dovetail surface of a pusher of the second adjustable vise may be used for retaining a part between it and dovetail ledge 901 or a dovetail ledge of another gripper (not shown) that replaces gripper 1103 (below). The location of the dovetail ledge 901, and the drive screw being rotatable from either end of the vise, enables gripping and securing machinable parts of any dimension and/or orientation. It is noted that machineable parts often have a dovetail formed in the base of the part to further ensure a secure retention of the part during machining.

Preferably, the distal ledge 901 of the adjustable vise is a dovetail ledge, as depicted. Due to the arrangement of the dovetail distal ledge 901, the vise may be tightened on a part in a first proximal direction, securing a part between the pusher of vise and a dovetail ledge of a second adjustable vise. The arrangement further enables tightening the vise to a part in a second distal direction, securing a second part between the pusher and a proximal ledge 903 of the adjustable vise. Although the distal ledge 901 and the proximal ledge 903 are preferably dovetail ledges, alternatively the distal ledge 901 and/or the proximal ledge 903 is/are straight, grooved, serrated, or combinations thereof.

Referring now also to FIGS. 10A-10B in the drawings, the keeper assembly 707 is illustrated. The keeper assembly 707 includes an access opening 1001 for accessing and rotating the drive screw of the pusher assembly 715 and a plurality of torque openings 1003 for receiving a torque application tool, such as a wrench. The keeper assembly 707 further includes a keeper 1005 and a bushing 1007. The bushing 1007 is adhered, welded, brazed, or otherwise rigidly attached to a counter bore formed in an interior distal end of the keeper 1005. The bushing is dimensioned to house a rounded cap end of the drive screw of the pusher assembly 715. The keeper 1005 of the keeper assembly 707 is flush with a surface at a proximal end 753 of the adjustable vise 701.

Figure 11B:
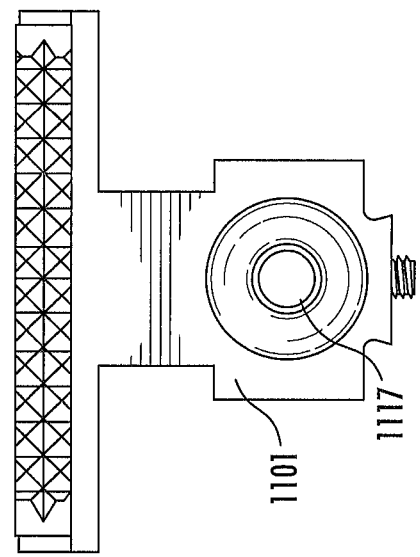
FIG. 11B is a front view of a pusher assembly in accordance with a preferred embodiment of the present application.
Figure 11A:
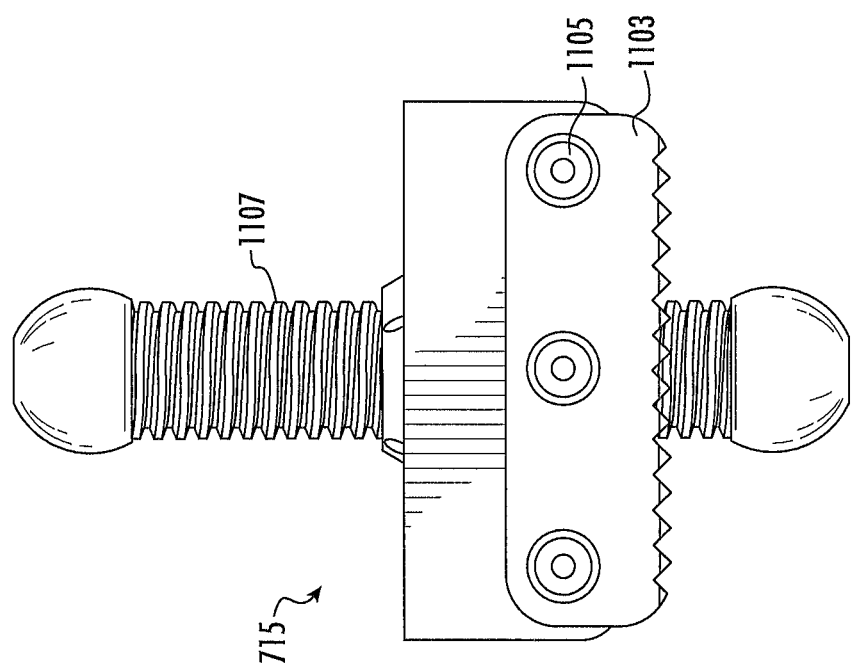
FIG. 11A is a top view of a pusher assembly in accordance with a preferred embodiment of the present application.
Figure 12A:
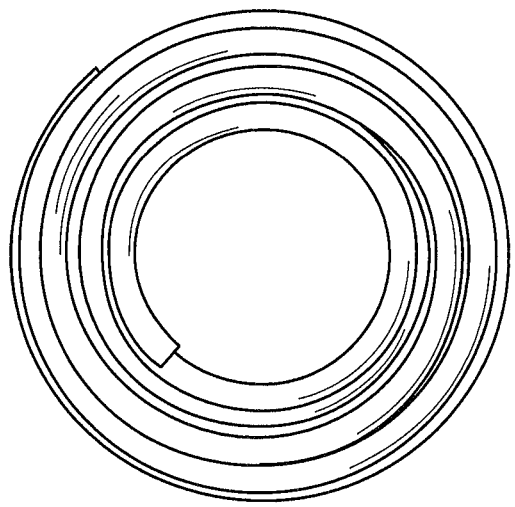
Figure 12B:
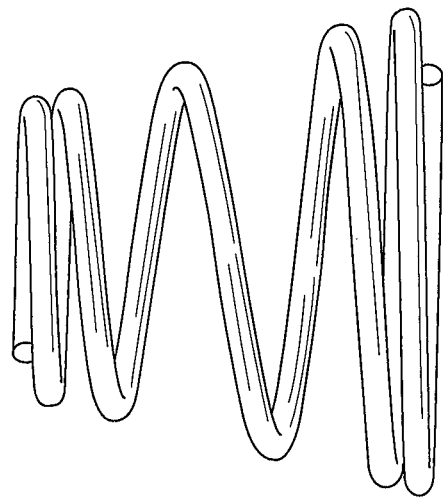
FIG. 12B— Depicts the spring in side view.
Figure 12C:
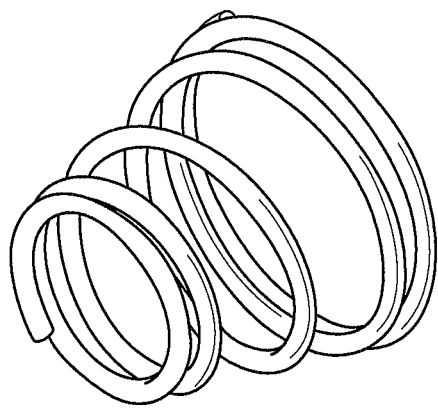
FIG. 12C— Depicts the spring in trimetric view.
Figure 13A:
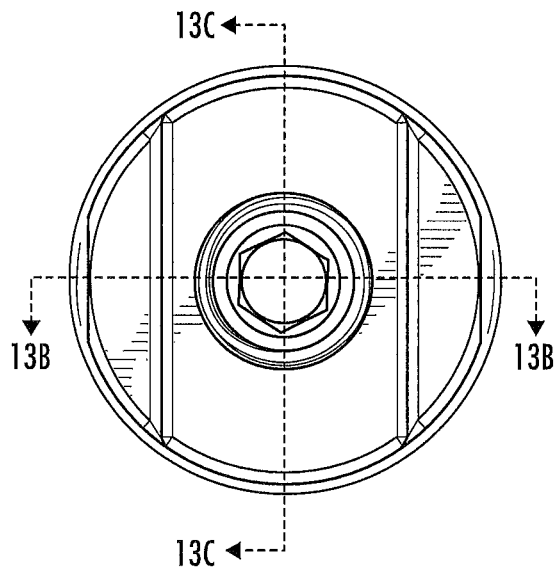
FIG. 13A— Depicts the assembled fastener in top view.
Figure 13B:
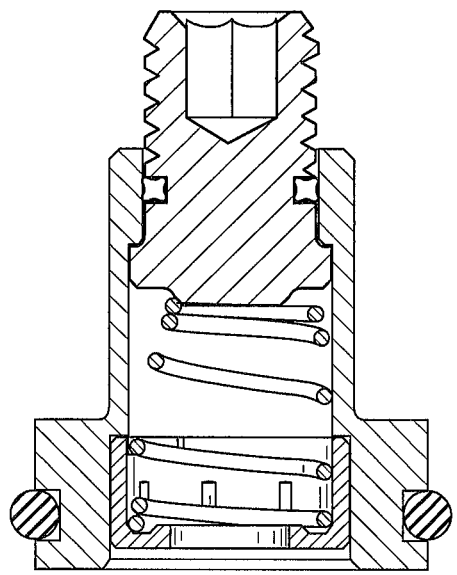
FIG. 13B— Depicts the assembled fastener in section view.
Figure 13C:
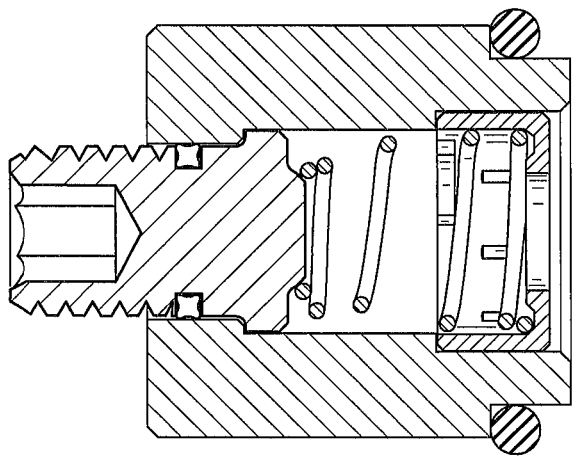
FIG. 13C— Depicts the assembled fastener in section view.
Figure 13D:
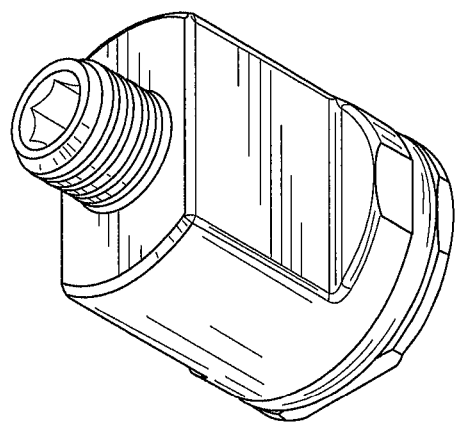

Referring now also to FIGS. 11A-11C in the drawings, the pusher assembly 715 is illustrated. The pusher assembly 715 includes a t-shaped pusher 1101, a gripper 1103 attached to the pusher 1101 by fasteners 1105, and a drive screw 1107. Preferably, fasteners 1105 are socket head cap screws; however, flat or conventional screws are used in other embodiments. The pusher 1101 is rotationally mounted to the drive screw 1107 using the adjustable anti-backlash nut 1109 and set screw 1113. Preferably, the distal end of the drive screw 1107 rotationally contacts the rounded opening 807 of base member 705 using a ¼-inch ball cup 1115. The proximal end of the drive screw 1107 also includes a ¾-inch ball cup 1115 to rotationally contact the bushing 1007 of the keeper assembly 707. The ball cups 1115 are secured to either end of the drive screw by way of welding, brazing, adhesive, bolt and washer, or combinations thereof. Alternatively, instead of the round to flat surface minimal contact provided by ball cup and bushing of the keeper assembly, other rotational attachments may also be used such as a Delrin® washer, ball end, ball bearings, a rotational flange joint, a bearing flange joint, or combinations thereof.

Pusher 1101 is rotationally coupled to the drive screw 1107 so that a keyed-end 1117 of the drive screw is rotated by the user, enabling the pusher 1101 to move along an axis defined by the t-slot 725 of the base member 705. The drive screw 1107 typically is rotated by insertion of a hex key in either end of drive screw 1107 and turning the hex key. Gripper 1103 is held to the pusher 1101 by threaded fasteners 1105 such that the gripper 1103 is replaceable and/or interchangeable with a gripper having a different smooth edge, grooved edge, serrated edge, or dovetail ledge. Gripper 1103 and the dovetail ledges 901 and 903 are the preferred locations on the adjustable vise 701 to secure the part retained.

Referring now also to FIGS. 12A through 23D, the adjustable vise member 701, the fixture plate (FIG. 14A-14E), a conventional base plate, a modular base plate, and combinations thereof are used with fasteners and devices as illustrated. FIGS. 12A through 23D are similar, if not identical to, FIGS. 1A-22E of U.S. patent application Ser. No. 15/883,991, filed 30 Jan. 2018, titled "Workholding System Using Quarter Turn Device", by Richard V. Miller, which is incorporated by reference in its entirety for all purposes.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A modular vise for securing a part, comprising:
   a pusher assembly, comprising:
      a pusher;
      a gripper;
      a drive screw; and
      an anti-backlash nut;
   a keeper assembly; and
   a base member having a distal end, a proximal end, a top surface, and a bottom surface;
   wherein the part is retained between the pusher assembly and the proximal end of the base member; and
   wherein the modular vise is configured, such that the modular vise may be secured and located to a working surface from underneath the bottom surface.

2. The modular vise according to claim 1, wherein the modular vise is secured to the working surface using at least two threaded bushings or two threaded fasteners.

3. The modular vise according to claim 1, wherein the modular vise is secured to the working surface using at least two locating pins.

4. The modular vise according to claim 1, wherein the modular vise is pin-locating in at least four different locations.

5. The modular vise according to claim 1, further comprising:
   a dovetail ledge disposed on the distal end of the base member.

6. The modular vise according to claim 1, wherein the drive screw is operable from a first side and a second side of the base member.

7. A modular pressure application system, comprising:
   a first adjustable vise, comprising:
      a pusher assembly, comprising:
         a pusher;
         a gripper;
         a drive screw; and
         an anti-backlash nut;
      a keeper assembly; and
      a base member having a distal end, a proximal end, a top surface, and a bottom surface;
   wherein a first part is retained between the pusher assembly and the proximal end of the base member; and
   wherein the first adjustable vise is configured, such that the first adjustable device may be secured and located to a working surface from underneath the bottom surface; and
   a second adjustable vise.

8. The modular pressure application system according to claim 7, wherein the first adjustable vise is secured to the working surface using at least two threaded bushings or two threaded fasteners.

9. The modular pressure application system according to claim 7, wherein the first adjustable vise is secured to the working surface using at least two locating pins.

10. The modular pressure application system according to claim 7, wherein the first adjustable vise is pin-locating in at least four different locations.

11. The modular pressure application system according to claim 7, wherein the distal end of the first adjustable vise includes a dovetail ledge.

12. The modular pressure application system according to claim 11, wherein the second adjustable vise comprises:
    a second pusher assembly;
    a second keeper assembly; and
    a second base member;
    wherein the second adjustable vise is positioned behind the distal end of the first adjustable vise on the working surface; and
    wherein a second part is retained between the second pusher assembly and the dovetail ledge of the first adjustable vise.

13. The modular pressure application system according to claim 7, wherein the working surface comprises a surface of a t-slot fixture.

14. The modular pressure application system according to claim 7, wherein the drive screw is operable from a first side and a second side of the base member.

15. A modular pressure application system comprising:
    a first adjustable vise, comprising:
       a pusher assembly, comprising:
          a pusher;
          a gripper;
          a drive screw; and
          an anti-backlash nut;
       a keeper assembly; and
       a base member having a distal end, a proximal end, a top surface, and a bottom surface; and
    a second adjustable vise;
    wherein a first part is retained between the pusher assembly and the proximal end of the base member;
    wherein the first adjustable vise is secured and located to a working surface from underneath the bottom surface; and
    wherein the drive screw is operable from a first side and a second side of the base member.

16. The modular pressure application system according to claim 15, wherein the keeper assembly comprises:
    a keeper; and
    a bushing.

17. The modular pressure application system according to claim 16, wherein the drive screw has a first rounded cup attached to a proximal end and a second rounded cup attached to a distal end;
 wherein the first rounded cup is housed within the bushing of the keeper assembly; and
 wherein the second rounded cup is housed within a rounded opening of the base member.

\* \* \* \* \*